(12) United States Patent
Roman

(10) Patent No.: US 8,356,548 B2
(45) Date of Patent: Jan. 22, 2013

(54) HYDRAULIC APPARATUS, HANDLE, AND METHOD OF PROVIDING AN EXTENDABLE HANDLE

(75) Inventor: David T. Roman, Chandler, AZ (US)

(73) Assignee: Cinta Tools, LLC, Scottsdale, AZ (US)

( * ) Notice: Subject to any disclaimer, the term of this patent is extended or adjusted under 35 U.S.C. 154(b) by 750 days.

(21) Appl. No.: 12/605,658

(22) Filed: Oct. 26, 2009

(65) Prior Publication Data

US 2011/0095213 A1   Apr. 28, 2011

(51) Int. Cl.
*F15B 15/16* (2006.01)
*B25G 1/00* (2006.01)

(52) U.S. Cl. .................. 92/117 A; 15/144.1; 16/429

(58) Field of Classification Search .......... 92/52, 117 A, 92/117 R; 15/144.1, 144.4; 16/429
See application file for complete search history.

(56) References Cited

U.S. PATENT DOCUMENTS

| | | | |
|---|---|---|---|
| 2,809,513 | A | 10/1957 | Ames |
| 2,824,442 | A | 2/1958 | Ames |
| 3,102,272 | A | 9/1963 | Emmert |
| 3,116,511 | A | 1/1964 | Hoveland |
| 3,186,597 | A | 6/1965 | Henderson |
| 3,343,202 | A | 9/1967 | Ames |
| 3,902,199 | A | 9/1975 | Emmert |
| 4,498,192 | A | 2/1985 | Becker et al. |
| 4,516,868 | A | 5/1985 | Molnar |
| 4,573,956 | A | 3/1986 | Johnson |
| 4,767,297 | A | 8/1988 | Mower et al. |
| 4,872,303 | A | 10/1989 | Johnson |
| 4,907,955 | A | 3/1990 | Snipes |
| 4,919,604 | A | 4/1990 | Wilson |
| 4,946,077 | A | 8/1990 | Olsen |
| 4,996,799 | A | 3/1991 | Pound et al. |
| 5,033,197 | A | 7/1991 | Irvello |
| 5,088,147 | A | 2/1992 | MacMillan |
| 5,099,539 | A | 3/1992 | Forester |
| 5,182,965 | A | 2/1993 | MacMillan |

(Continued)

FOREIGN PATENT DOCUMENTS

EP   1995459   11/2008

(Continued)

OTHER PUBLICATIONS

Office Action dated Nov. 29, 2011, for U.S. Appl. No. 12/697,839.

(Continued)

*Primary Examiner* — Thomas E Lazo
(74) *Attorney, Agent, or Firm* — Snell & Wilmer L.L.P.

(57) ABSTRACT

Handles, extendable handles, and linkage mechanisms are examples of apparatuses that include a body; a pivotably attached head; cylinder, actuator, or hydraulic actuator; a fluid passage or hose; and a valve, blocking means, or hydraulic control device. The valve, blocking means, or hydraulic control device may be normally open and may close only when held closed, and may be connected on one side to the fluid passage or hose and on another side to atmosphere. An operator may use a tool, such as a drywall flat box attached to the head, by holding the handle and controlling pivoting of the head by operating the valve. Methods include providing for an operator to control a tool on a handle, and include providing the handle and instructing the operator to actuate the blocking means to hold the tool in a constant orientation relative to the handle.

23 Claims, 16 Drawing Sheets

U.S. PATENT DOCUMENTS

| | | | |
|---|---|---|---|
| 5,343,982 A | 9/1994 | Min | |
| 5,368,461 A | 11/1994 | Murphy | |
| 5,419,693 A | 5/1995 | MacMillan | |
| 5,423,666 A | 6/1995 | MacMillan | |
| 5,535,926 A | 7/1996 | Blitz et al. | |
| 5,622,729 A | 4/1997 | Mower | |
| 5,695,788 A | 12/1997 | Woods | |
| 5,814,351 A | 9/1998 | Mower | |
| 5,882,691 A | 3/1999 | Conboy | |
| 6,146,039 A | 11/2000 | Pool et al. | |
| 6,260,238 B1 | 7/2001 | MacMillan | |
| 6,412,138 B1 | 7/2002 | MacMillan | |
| 6,461,074 B2* | 10/2002 | Taylor | 16/429 |
| 6,581,805 B2 | 6/2003 | Conboy et al. | |
| 6,648,803 B1 | 11/2003 | Jay | |
| 6,820,648 B2 | 11/2004 | Castagnetta, Jr. | |
| 6,874,557 B2 | 4/2005 | Jungklaus | |
| 7,096,530 B2* | 8/2006 | Goulet | 15/144.4 |
| 7,108,640 B2 | 9/2006 | Emmert | |
| 7,314,074 B2 | 1/2008 | Jungklaus | |
| 7,318,716 B2 | 1/2008 | Castagnetta, Jr. | |
| 7,473,085 B2 | 1/2009 | Schlecht | |
| 7,624,782 B2 | 12/2009 | Jungklaus et al. | |
| 7,631,389 B2* | 12/2009 | St. James et al. | 15/144.4 |
| 7,721,377 B2 | 5/2010 | Jungklaus et al. | |
| 7,798,194 B2 | 9/2010 | Jungklaus | |
| 2005/0100386 A1 | 5/2005 | Murray | |
| 2007/0259064 A1 | 11/2007 | Mathews | |
| 2008/0128534 A1 | 6/2008 | McLeod | |
| 2008/0292481 A1 | 11/2008 | Castagnetta, Jr. et al. | |
| 2009/0083928 A1 | 4/2009 | Salvino | |
| 2009/0094936 A1 | 4/2009 | Brown | |
| 2009/0117284 A1 | 5/2009 | Watters | |
| 2009/0199971 A1 | 8/2009 | Ross | |
| 2010/0014908 A1 | 1/2010 | Campbell et al. | |
| 2010/0038513 A1 | 2/2010 | Hughes | |
| 2010/0065719 A1 | 3/2010 | Szasz | |
| 2010/0071852 A1 | 3/2010 | Jungklaus et al. | |
| 2010/0196078 A1 | 8/2010 | Ovens | |

FOREIGN PATENT DOCUMENTS

| | | |
|---|---|---|
| JP | 61181563 | 8/1986 |

OTHER PUBLICATIONS

Office Action dated Mar. 9, 2012, for U.S. Appl. No. 12/697,839.

Response to Office Action dated Feb. 27, 2012, for U.S. Appl. No. 12/697,839.

Response to Office Action dated Apr. 17, 2012, for U.S. Appl. No. 12/697,825.

Restriction Response dated Mar. 20, 2012, for U.S. Appl. No. 12/697,825.

Flat Finisher Box, schematic, available at http://www.bannertown.com/columtiatools.htm., 1 page. May 9, 2000.

Flat Box and Easyclean Box, operation and maintenance guide, available at http://www.tapetech/com/tools.htm., 4 pages. Dec. 2003.

International Search Report and Written Opinion dated Oct. 19, 2010 for PCT/US2010/028193.

International Preliminary Report on Patentability dated Sep. 20, 2011 for PCT/2010/028193.

International Search Report and Written Opinion dated Oct. 24, 2011 for PCT/2011/023188.

Restriction Requirement dated Apr. 13, 2012, U.S. Appl. No. 12/605,636.

Ex Parte Quayle Action dated May 22, 2012, U.S. Appl. No. 12/605,636.

Notice of Allowance dated Jun. 8, 2012, U.S. Appl. No. 12/605,636.

U.S. Appl. No. 11/292,238, filed Nov. 30, 2005, inventor Werner Schlecht, entitled "Drywall Mud Pump" (now abandoned).

Flat Finisher Box, Schematic, available at http://www.bannertown.com/columbiatools.htm. May 9, 2000.

Flat Box and Easyclean Box, operation and maintenance guide, available at http//www.tapetech.com/tools.htm. Dec. 2003.

* cited by examiner

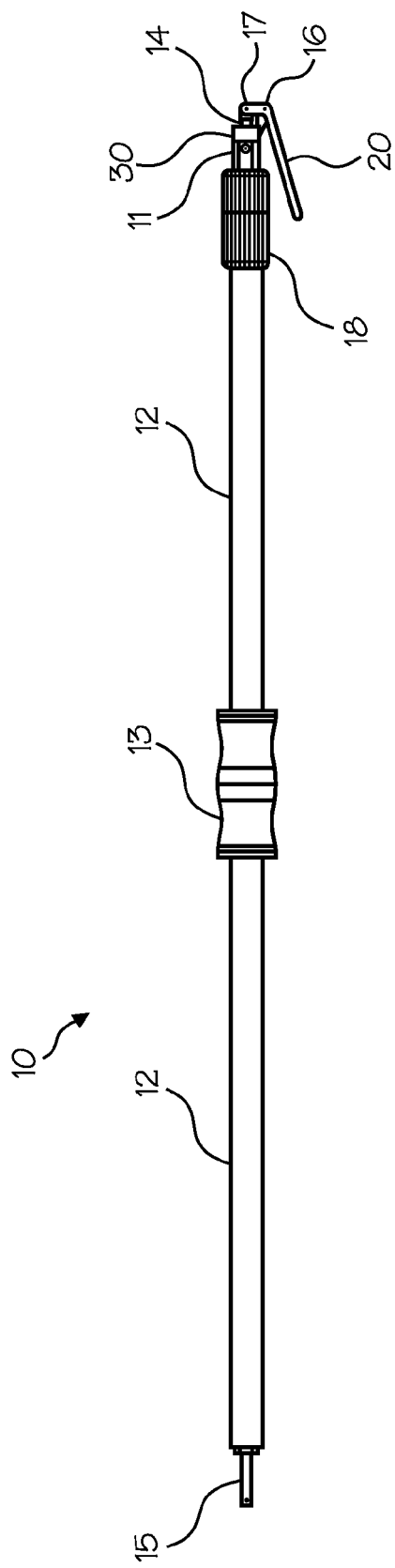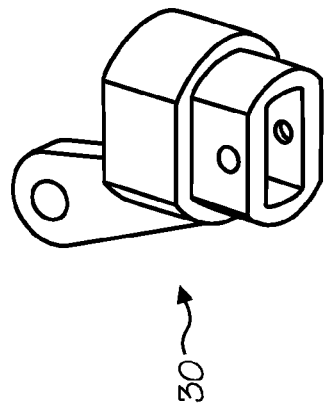

HYDRAULIC APPARATUS, HANDLE, AND METHOD OF PROVIDING AN EXTENDABLE HANDLE

RELATED PATENT APPLICATIONS

This patent application incorporates by reference U.S. patent application Ser. No. 12/605,636 filed on Oct. 26, 2009, now U.S. Pat. No. 8,272,105 titled: EXTENDABLE LINKAGE, EXTENDABLE HANDLE, AND DRYWALL TOOL WITH EXTENDABLE HANDLE, having the same inventor. These two patent applications have certain disclosure in common, but were filed with different claims.

FIELD OF THE INVENTION

This invention relates to apparatuses for controlling motion over a distance and methods of providing such apparatuses. Particular embodiments relate to handles for tools, including extendable handles, and certain embodiments relate specifically to drywall tools, such as tools for applying drywall joint compound between sheets of drywall.

BACKGROUND OF THE INVENTION

Many types of apparatuses have been developed for controlling motion over a distance. For example, many types of linkages have been used for transferring motion, force, or both, over a distance. Such linkages have been used, for example, to operate an actuator that is some distance away. In various applications, a tensile member, such as a rod has been used to transfer the motion or force over a distance. A structural member has been used in opposition to the tensile member, for example, to maintain distance between a local master actuator that is used to produce the force or motion and a more-distant slave actuator that uses the force or motion to accomplish a task. In addition, hydraulic actuators have been used to control motion, and the flow of hydraulic fluid has been controlled to control hydraulic actuators. In some applications, air has been used as a hydraulic fluid.

In a number of applications, it has been necessary or desirable for the distance between the master actuator and the more-distant slave actuator to change, and yet for the linkage to still accomplish its function. Extendable linkage mechanisms have been developed with this capability. Hydraulic systems have also been used wherein the distance between a hydraulic actuator and a hydraulic control device have been varied.

In a specific application, for example, a number of apparatuses or tools have been invented and used for dispensing drywall joint compound, for instance, between sheets of drywall. A number of such drywall tools have handles, and some such handles have linkages associated with, or inside, the handles. Some such handles have been developed that are extendable. But problems have been encountered with such handles, and opportunity for improvement exists.

Drywall, also known as gypsum board, wallboard, and plasterboard, is a building material used to finish the interior surfaces of walls and ceilings in houses and other buildings. Rigid sheets or panels of drywall are formed from gypsum plaster, the semi-hydrous form of calcium sulphate (CaSO4.½H2O), which is typically sandwiched between two layers of heavy paper or fiberglass mats. Drywall sheets are about ½ inch thick and are nailed or screwed in place to form the interior surfaces of the building, and provide fire resistance and sound deadening, among other benefits.

The joints between drywall sheets are typically filled and sealed with strips of paper or fiberglass mat and drywall joint compound, also called "joint compound", "drywall mud", or just "mud". Joint compound may be made, for example, of water, limestone, expanded perlite, ethylene-vinyl acetate polymer and attapulgite. Joint compound may be applied as a viscous fluid that is thick enough to maintain its shape while it hardens. In addition to forming joints, drywall mud is used to cover nail or screw heads, form a smooth or flat surface, and provide a texture over the surface. Paint or wall paper is typically applied over the drywall and joint compound.

Workers often specialize in the installation of drywall, and in large projects, different crews install the drywall panels (drywall hangers) from those who finish the joints and apply the joint compound (tapers or mud men). Workers who specialize in drywall installation often use specialized tools to increase their productivity including flat boxes that are tools used to hold joint compound and apply it to drywall joints. Joint compound is often mixed (e.g., with water) or stored in buckets, and drywall mud pumps have been used to pump the mud from the buckets into flat boxes or other tools or containers.

U.S. Pat. No. 7,473,085, patent application Ser. No. 11/453,455, publication 2007/0292196 (by Werner Schlecht) describes a drywall finishing tool that is commonly referred to as a "flat box", which is used to apply drywall joint compound between sheets of drywall that are in the same plane (e.g., that form parts of the same wall). Flat boxes have been used successfully for this purpose, and various tools been adapted to apply drywall joint compound to inside corners (e.g., the corners of a room) where sheets of drywall come together, typically, at a substantially right angle.

Examples of tool handles are described in U.S. Pat. Nos. 5,088,147, 5,099,539, 5,182,965, 6,260,238, and 6,412,138, as examples. In a number of embodiments, a master actuator, such as a lever, on a proximal end of the handle is used to operate a slave actuator on a distal end of the handle. The tool (e.g., a flat box) may be attached to a tool head at the distal end of the handle, and, in some embodiments, the slave actuator may be a clamp that may prevent the tool head from rotating about a pivot point at the proximal end of the handle. For example, in the case of a drywall flat box, the worker may position the flat box at the desired angle relative to the drywall surface by pressing the flat box against the drywall surface while holding the handle. The worker may then press the lever, clamping the flat box in the desired orientation. Then the worker may move the flat box along the drywall surface dispensing drywall joint compound in the process, with the flat box clamped into the desired orientation until the clamping action is no longer desired.

Extendable handles for such tools may be extended to the desired length (from a range of available length) before use in a particular situation, and then the length may be fixed using a locking mechanism. The length selected may depend, for example, on the size or height of the worker using the tool, the height of the wall or ceiling to which the drywall joint compound is being applied, or other factors. The patents listed above describe certain extendable linkage mechanisms that provide for adjustments to handle length while maintaining desired operation between the master actuator and the slave actuator.

Needs and potential for benefit exist for adaptations and improvements to certain extendable linkage mechanisms that may be used, for example, for handles for tools, such as drywall tool, or specifically, for instance, handles for flat boxes that may be used to apply drywall joint compound where sheets of drywall come together. Problems that may be overcome by such adaptations and improvements include increasing the useful life of components, reducing cost of manufacture, increasing effectiveness, reducing weight, and the like. In addition, needs and potential for benefit exist for extendable linkage mechanisms, extendable handles, drywall joint compound dispensing tools, and other apparatuses that are inexpensive to manufacture, reliable, easy to use, that have a long life, that are easy to service and clean, and that are simple in operation so that typical operators can effectively maintain them. Room for improvement exists over the prior art in these and other areas that may be apparent to a person of ordinary skill in the art having studied this document. Other needs and potential for benefit may also be apparent to a person of skill in the art of specialized drywall tools.

SUMMARY OF PARTICULAR EMBODIMENTS OF THE INVENTION

Various embodiments provide, for example, as an object or benefit, that they partially or fully address or satisfy one or more of the needs, potential areas for benefit, or opportunities for improvement described herein, or known in the art, as examples. Some embodiments of the invention provide, among other things, various apparatuses, extendable linkage mechanisms, improved extendable handles (e.g., for tools), and tools having extendable handles, such as drywall tools (e.g., tools for dispensing drywall joint compound), and methods of providing, manufacturing, or making such devices, as examples. Tools for dispensing drywall joint compound, for instance, may be used to apply drywall joint compound between and/or over sheets of drywall. Workers or operators may use such tools, for example, who specialize in the installation of drywall, or specifically, those who finish the joints and apply the joint compound (tapers or mud men), for instance. Various embodiments provide, for example, as an object or benefit, that they provide specialized tools to increase the productivity of such workers, including tools used to hold joint compound and apply it to drywall joints.

A number of embodiments provide, for example, as objects or benefits, adaptations and improvements to apparatuses, linkages, or handles, for instance, to allow them to operate effectively at selected lengths, for instance, over a range of lengths. In addition, various embodiments provide, for instance, as an object or benefit, that they provide a handle or a drywall dispensing tool that is easier to operate, for example, easier to control the release of drywall joint compound while holding the tool and smoothing the joint compound. Furthermore, some embodiments provide, as an object or benefit, for instance, that they provide dispensing tools that provide for the operator to be able to control the angle of the tool head, for instance, to compensate for different heights of the work surface, to provide for optimization, to adjust for personal preference, to adjust for particular circumstances, or a combination thereof, as examples.

Moreover, particular embodiments provide, as an object or benefit, for instance, drywall joint compound dispensing tools, extendable handles, and other apparatuses, that are inexpensive to manufacture, reliable, easy to use, that have a long life, that are easy to service and clean, and that are simple in operation so that typical operators can effectively maintain them.

Benefits of various embodiments of the invention exist over the prior art in these and other areas that may be apparent to a person of ordinary skill in the art having studied this document. These and other aspects of the present invention may be realized in whole or in part in various linkages, handles, tools for dispensing drywall joint compound and other apparatuses as shown, described, or both in the figures and related description herein. Other objects and benefits may also be apparent to a person of skill in the art of linkages, hydraulic systems, tool handles, and specialized drywall tools or other apparatuses, for example. Besides tools for dispensing drywall joint compound, some embodiments may be used for other purposes. Other uses and applications may be described herein or may be apparent to a person of skill in the art.

In specific embodiments, this invention provides various apparatuses which may serve as handles, tool handles, linkage mechanisms, or the like, and may be extendable. Certain such apparatuses include, for example, a body, a head pivotably attached to the body at a first pivot point, a cylinder having an inside surface attached to the body, a piston located at least partially within the cylinder, the piston comprising a seal that seals against the inside surface of the cylinder, or a combination thereof, for example. Further, a number of such embodiments further include a rod connected at a first end to the piston and pivotably connected at a second end to the head at a second pivot point, a fluid passage extending from the cylinder through the body, a valve connected on a first side to the fluid passage and on a second side to atmosphere, or a combination thereof, for instance.

In various embodiments, the body may be hollow, and the cylinder, the fluid passage, and the valve may all be at least partially located within the body, for example. Further, in some embodiments, the body may be elongated, for example, and may form a handle, and in some embodiments, the head may include, for instance, a mounting surface for a tool, and may be, for example, adapted for connection to the tool. And in some embodiments, the apparatus may be, for example, configured for an operator to use the tool by holding the handle and to control pivoting of the head about the first pivot point by operating the valve. In some embodiments, the fluid passage may include, for instance, a hose. Further, in particular embodiments, the valve may be, for example, a type that is normally open and that closes when held closed by an operator.

In some embodiments, the body may include, for instance, a first structural member and a second structural member, and in various embodiments, the first structural member may slidably engage the second structural member over a range of distance. Further, in a number of embodiments, the body may further include, for instance, a locking mechanism configured to releasably lock the first structural member to the second structural member at multiple points over the range of distance. In addition, in some embodiments, the first structural member and the second structural member are both tubular, and in particular embodiments, the first structural member telescopically engages the second structural member over the range of distance. Moreover, in some embodiments, the cylinder, the fluid passage, the valve, or a combination thereof, are located at least partially within the body.

In certain embodiments, the head may be, for example, pivotably attached to the first structural member, the cylinder may be, for example, located at least partially within the first structural member, or both. Further, in a number of embodiments, the fluid passage may include, for instance, helically wound hose, the valve may be, for example, located at least partially in the second structural member, or both, as examples.

The invention also provides, as another example, an apparatus that includes, for instance, a body that includes a first structural member and a second structural member, and in some embodiments, the first structural member may slidably engage the second structural member over a range of distance.

In various embodiments, the body may further include, for instance, a locking mechanism configured to releasably lock the first structural member to the second structural member at multiple points over the range of distance. In a number of embodiments, such an apparatus may further include a head pivotably attached to the first structural member at a first pivot point, an actuator attached to the first structural member and attached to the head, and positioned and configured to control movement of the head relative to the first structural member about the first pivot point, and a hose extending from the actuator to the second structural member, for example. Various such embodiments further include a blocking means, for instance, for blocking movement of fluid through the hose, for example, at the second structural member.

In some embodiments, the actuator may include, for instance, a cylinder having an inside surface and a piston located at least partially within the cylinder. The piston may include, for instance, a seal that seals against the inside surface of the cylinder. Various such apparatuses may further include, for instance, a rod connected at a first end to the actuator and pivotably connected at a second end to the head, for instance, at a second pivot point. Further, in some embodiments, the blocking means may include, for instance, a valve connected on a first side to the hose, or an open orifice sized, shaped, and positioned to be blocked by an operator using a portion of the operator's hand, as another example. In a number of embodiments, the blocking means may be, for example, open on a second side to atmosphere for release or introduction of air through the hose to the actuator, for instance.

In various embodiments, the body may be, for example, hollow, and the actuator, the hose, the blocking means, or a combination thereof (e.g., all), may be at least partially located within the body. In some embodiments, the body may be, for example, elongated and may form a handle, and in some embodiments, the head may include, for instance, a mounting surface for a tool, and may be, for example, adapted for connection to the tool. Further, in some embodiments, the apparatus may be, for example, configured for an operator to use the tool by holding the handle and to control pivoting of the head about the first pivot point by operating the blocking means. In some embodiments, the blocking means may be, for example, be a type that is normally open and that closes when held closed by an operator, for instance.

In a number of embodiments, the first structural member and the second structural member are both tubular, and in some embodiments, the first structural member telescopically engages the second structural member over the range of distance. In some embodiments, the hose and the blocking means are at least partially located within the body. In particular embodiments, the head may be, for example, pivotably attached to the first structural member, the actuator may be, for example, located at least partially within the first structural member, the hose may be, for example, helically wound, or a combination thereof. Further, in some embodiments, the blocking means may be, for example, located at least partially within the second structural member.

In yet another embodiment, this invention also provides various methods, for instance, of providing for an operator to control a tool on a handle. Such methods may include, for instance, in any order at least certain acts. Examples of such acts include, for example, an act of providing an extendable handle configured to be attached to the tool. In particular embodiments, the extendable handle may include, for instance, a body that may include, for instance, a first structural member and a second structural member. In some embodiments, for example, when the body is assembled, the first structural member may slidably engage the second structural member over a range of distance. The body may further include, for instance, a locking mechanism configured to releasably lock the first structural member to the second structural member at multiple points over the range of distance. In some embodiments, the first structural member and the second structural member are both tubular, and in some embodiments, when the body is assembled, the first structural member telescopically engages the second structural member over the range of distance.

In various embodiments, the extendable handle may further include, for instance, a head which, when the extendable handle is assembled, may be, for example, pivotably attached to the first structural member at a first pivot point. Further, in some embodiments, the extendable handle may include an actuator which, when the extendable handle is assembled, may be, for example, attached to the first structural member and attached to the head, and positioned and configured to control movement of the head relative to the first structural member about the first pivot point. Further still, in some embodiments, the extendable handle may include a hose which, when the extendable handle is assembled, may extend inside the body from the actuator into the second structural member. Even further, in some embodiments, the extendable handle may include, a blocking means for blocking movement of fluid through the hose at the second structural member. Various such methods may also include an act of instructing an operator of the tool to actuate the blocking means to hold the tool in a constant orientation relative to the handle.

In some embodiments, the act of providing an extendable handle may include, for instance, providing, as the actuator, a cylinder having an inside surface and a piston located at least partially within the cylinder. In some embodiments, the piston may include, for instance, a seal that seals against the inside surface of the cylinder. Moreover, in some embodiments, the act of providing an extendable handle may include, for instance, providing, as the blocking means, a valve connected on a first side to the hose, and connected on a second side to the atmosphere for release or introduction of air through the hose to the actuator. Further, some such methods may further include, for instance, an act of instructing an operator of the tool to attach a drywall tool to the handle and use the drywall tool and handle to apply drywall joint compound to joints between sheets of drywall. Moreover, some methods may include, for instance, an act of instructing an operator of the tool to release the blocking means to allow the tool to move relative to the handle, as another example.

This invention also provides an apparatus that includes, for instance, an elongated body including a first tubular member and a second tubular member, wherein, the first tubular member slidably and telescopically engages the second tubular member over a range of distance. In various embodiments, the body may further include, for instance, a locking mechanism configured to releasably lock the first tubular member to the second tubular member at multiple points over the range of distance. Further, such apparatuses may include a head pivotably attached to the first tubular member at a first pivot point, and a hydraulic actuator located at least partially within the first tubular member and positioned and configured to control movement of the head relative to the first tubular member about the first pivot point.

Various embodiments further include a hose extending from the hydraulic actuator, through the first tubular member, and into the second tubular member, and a hydraulic control device connected to the hose. In some embodiments, the hydraulic control device may be, for example, located at least partially at least partially within the second tubular member, and in some embodiments, manual operation of the hydraulic control device causes the hydraulic actuator to actuate via hydraulic fluid in the hose to control movement of the head relative to the first tubular member about the first pivot point.

In some embodiments, the hydraulic actuator may include, for instance, a cylinder having an inside surface and a piston located at least partially within the cylinder. The piston may include, for instance, a seal that seals against the inside surface of the cylinder. A number of embodiments may further include, for instance, a rod connected at a first end to the hydraulic actuator. Moreover, various embodiments may include a linkage extending from a second pivot point in rigid relation to the rod to a third pivot point in rigid relation to the head, for example.

In particular embodiments, the hydraulic control device may include, for instance, a valve connected on a first side to the hose. In some embodiments, the hydraulic actuator may be, for example, a pneumatic actuator, the hydraulic control device may be a pneumatic control device, the hydraulic fluid may be air, the hose may contain air, or a combination thereof, as examples. In some embodiments, the hydraulic control device may include, for instance, an open orifice sized, shaped, and positioned to be blocked by an operator using a portion of the operator's hand. Further, in some embodiments, the hydraulic control device may be, for example, open on a second side to atmosphere for release or introduction of air through the hose to the hydraulic actuator.

In some embodiments, the body forms a handle, and in particular embodiments, the head may include, for instance, a mounting surface for a tool, and may be, for example, adapted for connection to the tool. And in some embodiments, the apparatus may be, for example, configured for an operator to use the tool by holding the handle and to control pivoting of the head about the first pivot point by operating the hydraulic control device. Moreover, in certain embodiments, the hydraulic control device may be, for example, a valve of a type that is normally open and that closes when held closed by an operator.

In addition, various other embodiments of the invention are also described herein.

BRIEF DESCRIPTION OF THE DRAWINGS

FIG. 1 is as side view of an extendable handle for a drywall tool, for instance, which is an example of a linkage mechanism;

FIG. 2 is an isometric view of a lever or master actuator for the handle or linkage mechanism of FIG. 1;

FIG. 3 is an isometric view of a cap for the handle or linkage mechanism of FIG. 1, that attaches via pinned connections to the lever or master actuator of FIG. 2 and to the body or structural member of the handle or linkage mechanism;

Figure 4:
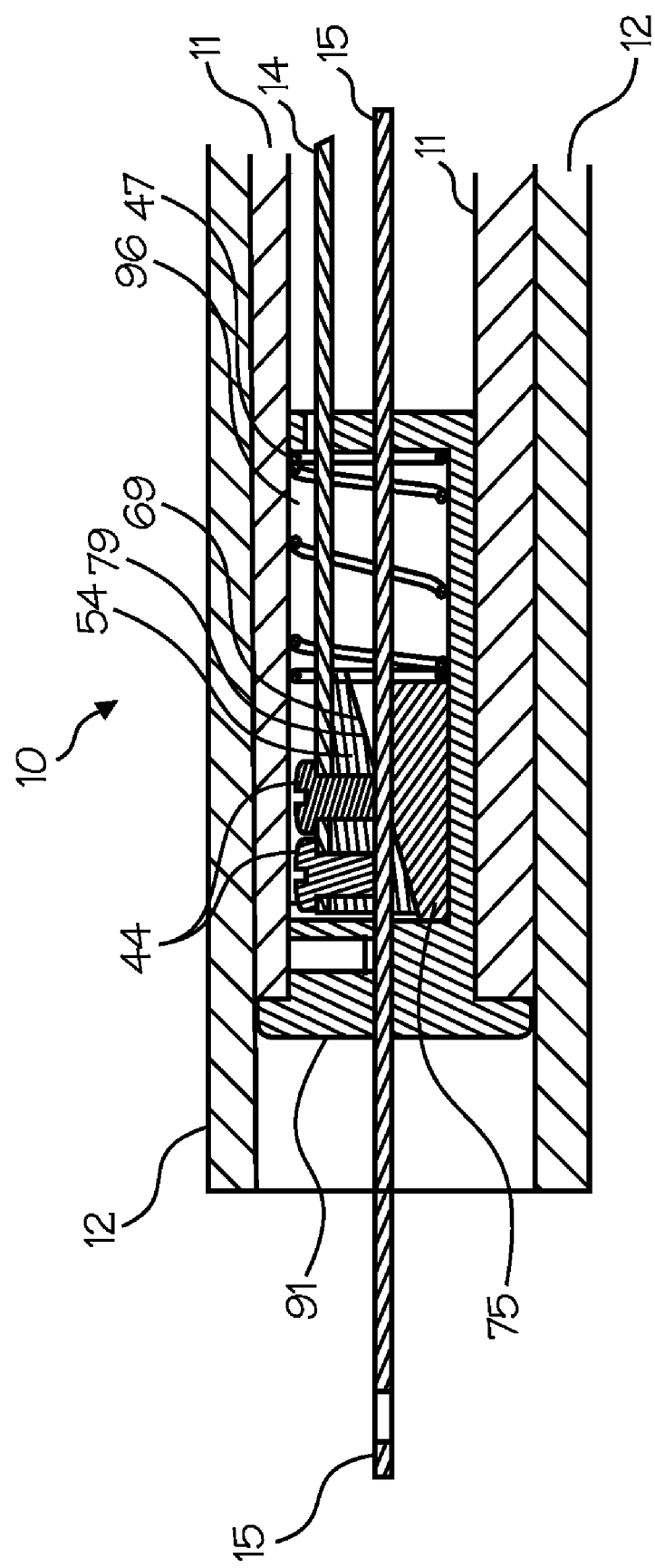
FIG. 4 is a top cross-sectional view of the handle or linkage mechanism of FIG. 1 showing internal mechanical components that provide for operation of the handle over a range of extendable length including master and slave wedges within a wedge compartment and a single wedge spring.

The drawings illustrate, among other things, various examples of embodiments of the invention, and certain examples of characteristics thereof. Different embodiments of the invention include various combinations of elements or acts shown in the drawings, described herein, known in the art, or a combination thereof, for instance.

DETAILED DESCRIPTION OF EXAMPLES OF EMBODIMENTS

Among other things, various embodiments are, or include, extendable linkage mechanisms, for example, for operating a slave actuator over a range of distances from a master actuator; improved extendable handles, for instance, for operating a tool over a range of handle length; and improved tools for use by an operator, for example, for dispensing drywall joint compound into joints between sheets of drywall. Further, various embodiments include apparatuses or handles (e.g., extendable handles), for instance, that have pistons, cylinders, fluid passages, slidably engaging structural members, pivotable heads, actuators (e.g., hydraulic or pneumatic actuators), blocking means, hydraulic control devices, or a combination thereof. Moreover, various embodiments include methods of providing such apparatuses and mechanisms, such as handles or extendable handles, that include acts such as providing various components, instructing operators how to use the apparatuses or mechanisms, and the like.

FIG. 1 illustrates an example of an extendable linkage mechanism, linkage mechanism 10, which may be used, for instance, for operating a slave actuator over a range of distances from a master actuator. Linkage mechanism 10 is also an example of an improved extendable handle for operating a tool over a range of handle length. For instance, linkage mechanism 10 may be an extendable handle having a range of handle length that is configured to attach to a tool for use by an operator for dispensing drywall joint compound into joints between sheets of drywall.

FIG. 1 to FIG. 12 illustrate various examples of extendable linkage mechanisms, for instance, for operating a slave actuator over a range of distances from a master actuator, examples of extendable handles, for instance, for operating a tool over a range of handle length; and certain examples of tools, for instance, for use by an operator for dispensing drywall joint compound into joints between sheets of drywall. As will be described, slanted engagement surfaces on master and slave wedges engage each other as well as master and slave rods to transmit motion and force at varying distances, for instance, from a lever at one end of the mechanism or handle, to a clamp at the other end. In a number of embodiments, an elongated slave rod passes through orifices in the wedges. Structural or tubular members may slidably engage to provide extendability.

Visible in FIG. 1, linkage mechanism 10 includes first structural member 11, and second structural member 12 which movably engages first structural member 11 over the range of distances. In this embodiment, first structural member 11 is an elongated (first) tubular member, and second structural member 12 is an elongated (second) tubular member that telescopically engages first structural (tubular) member 11 over the range of distances (e.g., over the range of handle length). In FIG. 1, extendable linkage mechanism 10 is extended at or near the minimum range of distances (e.g., minimum handle length). Otherwise, more of first structural member 11 would be visible. In some embodiments, first structural member 11 may be about the same length as structural member 12, for example. As used herein, "about" when referring to length, means within plus or minus 10 percent.

In the embodiment illustrated, linkage mechanism 10 includes lever or master actuator 20 which is connected to elongated master rod 14 that extends into structural member 11 out of view. An example embodiment of master actuator 20 is shown in more detail in FIG. 2. Master actuator 20, in this embodiment, is configured to be used (e.g., by the operator) to pull on master rod 14, for example, relative to first tubular member 11. In the embodiment illustrated, linkage mechanism 10 also includes elongated slave rod 15 which extends into second structural member 12. In this example, master rod 14 is located partially within first structural member 11 and slave rod 15 is located partially within second structural member 12. Linkage mechanism 10 also includes grip 13, in the embodiment illustrated, which is a grip that can be held by the operator when using linkage mechanism 10 (e.g., as a handle). Other embodiments may omit a grip (e.g., 13) or may have a different type of grip, as other examples.

FIG. 2 shows a closer view of an example of lever or master actuator 20. As shown in FIG. 1, in the embodiment illustrated, lever or master actuator 20 is connected to first structural member 11 (as the term "connected" is used herein) via pin 16 and cap 30, and lever or master actuator 20 is connected to master rod 14 via pin 17. Pins 16 and 17 provide pivotable connections in this embodiment, and cap 30 is rigidly connected to first structural member 11 in this embodiment. FIG. 3 shows a closer view of an example of cap 30. In this embodiment, the holes at the base of cap 30 are threaded and cap 30 is attached to structural member 11 with two fasteners or screws. Thus, in the embodiment illustrated, master actuator 20 includes a lever connected by first pin 16 to first structural member 11 (e.g., via cap 30) and connected by second pin 17 to master rod 14.

As shown in FIG. 1, in the embodiment illustrated, linkage mechanism 10 also includes locking mechanism 18 which is configured to releasably lock first structural member 11 to second structural member 12, for instance, at multiple points or at any point over the range of distances (or handle length) mentioned above. Locking mechanism 18 may twist to lock (e.g., clamping the end of structural member 12 against part of structural member 11, for instance, at any point over the range of distances). Other locking mechanisms may insert a pin or detent into one or more of multiple holes (e.g., at multiple points) in one or both of the structural members 11 and 12, as other examples.

Other components of linkage mechanism 10 are located inside first structural member 11, inside second structural member 12, or both, and are not visible in FIG. 1. FIG. 4, however, shows additional internal workings of linkage mechanism 10. The portion of FIG. 1 that is shown in FIG. 4 is near the left hand end of FIG. 1. In FIG. 4, slave rod 15 is shown projecting from second structural member 12. In FIG. 4, linkage mechanism 10 is shown fully or nearly fully retracted (e.g., as, or nearly as short as possible). In the embodiment illustrated, the components shown in FIG. 4 allow linkage mechanism 10 to be extended and retracted over the range of distance (e.g., by loosening or disconnecting locking mechanism 18 shown in FIG. 1) while still allowing a movement of lever 20 to result in a movement of slave rod 15.

In FIG. 4, first structural member 11 is located concentrically inside second structural member 12 with a close clearance therebetween. In a number of embodiments, first structural member 11 may have a circular cross section except having one flat outside surface, and second structural member 12 may have a circular cross section except having one mating flat inside surface so that structural members 11 and 12 slide lengthwise relative to each other (e.g., telescopically), but are prohibited from rotating relative to each other by the flat surfaces. Other embodiments may have two or more flat surfaces, the flat surface(s) may be on the inside of both structural members (e.g., 11 and 12), or both. Other embodiments may have a different shape cross section such as oval, polygonal, square, rectangular, pentagonal, hexagonal octagonal, triangular, splined, having one or more grooves or keyways, having a projection, or the like, as examples.

Figure 5:
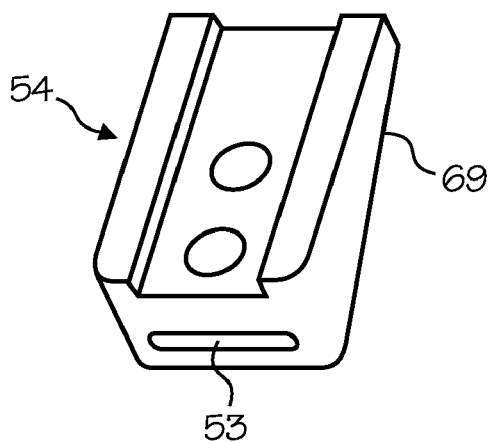
FIG. 5 is an isometric view of the master wedge for the handle or linkage mechanism of FIG. 1 and FIG. 4.
Figure 6:
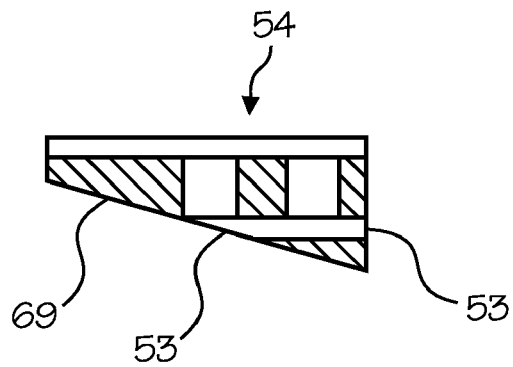
FIG. 6 is a top view of the master wedge of FIG. 5 for the handle or linkage mechanism of FIG. 1 and FIG. 4.

As shown in FIG. 4, in the embodiment illustrated, linkage mechanism 10 includes master wedge 54 which is connected to master rod 14 via fasteners or screws 44. In this embodiment, master wedge 54 has a master slanted engagement surface 69 and a master wedge slave rod orifice 53 extending through master wedge 54 from master slanted engagement surface 69 substantially parallel to master rod 14. More-detailed views of master wedge 54, of this embodiment, are shown in FIG. 5 and FIG. 6. As used herein, substantially parallel means parallel to within five (5) degrees. In this embodiment, master slanted engagement surface 69 is set at an angle of 16 degrees from master wedge slave rod orifice 53 and master rod 14. In other embodiments, this angle may be 7, 8, 9, 10, 11, 12, 13, 14, 15, 17, 18, 19, 20, 21, 22, 23, 24, or 25 degrees, as other examples. As used herein, unless stated otherwise, angles are within plus or minus one degree. In other embodiments, this angle may be approximately one of the angles recited above. As used herein, when referring to an angle, "approximately" means within plus or minus three degrees. In the embodiment shown, slave rod 15 passes through master wedge slave rod orifice 53 as shown in FIG. 4.

Figure 7:
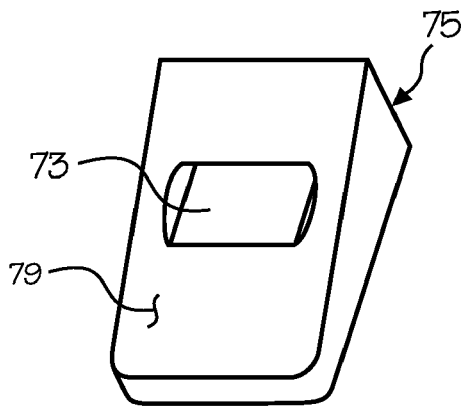
FIG. 7 is an isometric view of the slave wedge for the handle or linkage mechanism of FIG. 1 and FIG. 4.
Figure 8:
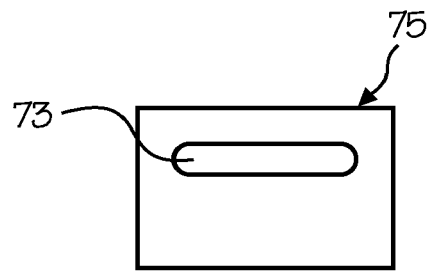
FIG. 8 is an end view of the slave wedge of FIG. 7 for the handle or linkage mechanism of FIG. 1 and FIG. 4.

Still referring to FIG. 4, in the embodiment illustrated, linkage mechanism 10 further includes slave wedge 75 having slave slanted engagement surface 79 for engaging master slanted engagement surface 69 of master wedge 54. Closer views of an embodiment of slave wedge 75 are shown in FIG. 7 and FIG. 8. In this embodiment, slave wedge 75 has slave wedge slave rod orifice 73 extending through slave wedge 75 from slave slanted engagement surface 79, substantially parallel to master rod 14 and substantially parallel to slave rod 15. In this embodiment, slave slanted engagement surface 79 is set at an angle of 16 degrees from slave wedge slave rod orifice 73, as well as master rod 14 and slave rod 15. In other embodiments, this angle may be one of the angles (or approximately one of the angles) described above for the angle between master wedge slave rod orifice 53 and master rod 14, as other examples. In a number of embodiments the angle of slave slanted engagement surface 79 and master slanted engagement surface 69 of the two wedges 54 and 75 may be the same or approximately the same, as examples.

In the embodiment illustrated, master rod 14 and slave rod 15 are elongated flat bars with a substantially rectangular cross section, which may have rounded corners. Slave rod 15 may fit with a close clearance fit within master wedge slave rod orifice 53 and slave wedge slave rod orifice 73, for example, and master rod 14 may have holes therethrough for screws 44, for instance. As shown in FIG. 4, in the embodiment illustrated, slave rod 15 slidably passes through master wedge slave rod orifice 53 and slave wedge slave rod orifice 73. In other embodiments, master rod 14, slave rod 15, or both, may have a different cross section, such as round, square, rectangular with different proportions, triangular, pentagonal, hexagonal, octagonal, semicircular, oval, or the like, as examples, which may be solid or hollow, for instance. Certain embodiments may have multiple master rods, multiple slave rods, or both, as other examples. In different embodiments, master wedge slave rod orifice 53 and slave wedge slave rod orifice 73 may have shapes that correspond to the cross section of slave rod 15, and master wedge 54 may be configured to receive the particular cross section of master rod 14, for example.

Figure 9:
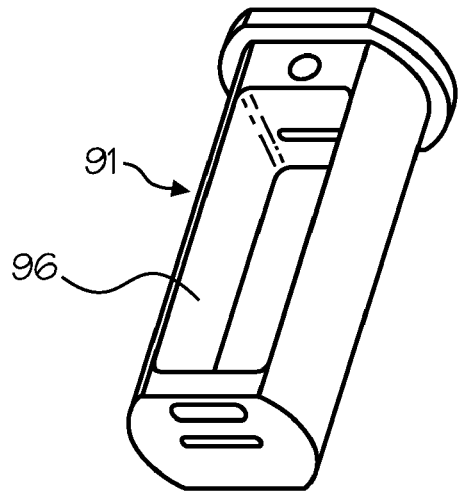
FIG. 9 is an isometric view of the cartridge frame for the wedge compartment for the handle or linkage mechanism of FIG. 1 and FIG. 4.

In the embodiment illustrated in FIG. 4, master wedge 54 and slave wedge 75 are located within cartridge frame 91, which fits inside and is attached to the end of first structural member 11. A closer view of cartridge frame 91 is shown in FIG. 9. In this embodiment, cartridge frame 91 defines wedge compartment 96. In this embodiment, cartridge frame 91 and wedge compartment 96 are located within first tubular member 11 and are also located within second tubular member 12 over the full range of distance of expansion of linkage mechanism 10. In various embodiments, at least one wedge spring may be provided to push or pull (i.e., bias) one or both of the wedges. In the embodiment shown in FIG. 4, for example, wedge compartment 96 contains slave wedge 75, master wedge 54, and one helical wedge spring 47. Wedge spring 47 in FIG. 4 is an example of a single wedge spring biasing both the slave wedge (75) and the master wedge (54), specifically, in a direction away from the lever or master actuator (20).

Figure 10:
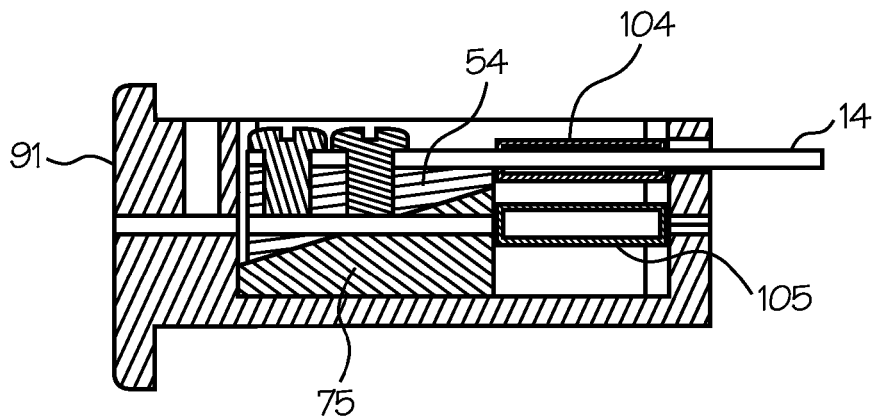
FIG. 10 is a top cross-sectional view of alternate internal components the handle or linkage mechanism of FIG. 1 showing master and slave wedges within a wedge compartment and two separate master and slave wedge springs.

FIG. 10 illustrates another embodiment having two helical wedge springs. In this embodiment, slave wedge spring 105 biases slave wedge 75, and master wedge spring 104 biases master wedge 54. In this example, slave rod 15 (not shown in FIG. 10, but shown in FIG. 4) would pass through slave wedge spring 105, and master rod 14 (shown) passes through master wedge spring 104.

Various embodiments include a slave actuator, which may be connected to the slave rod (e.g., 15) and may be configured to be operated by a pull on the slave rod. In some embodiments, the slave actuator may be connected to the slave rod with a pin, for example, and in particular embodiments, may be mounted on, to, or in, second structural or tubular member 12, as examples. In certain embodiments, the slave actuator is or includes a clamp releasably operated by a pull of slave rod 15. In particular embodiments, such a clamp may clamp a hinge pin, for example, causing a head for mounting a tool or the tool itself to bind or become fixed relative to the handle, structural members, or body, for example. Examples of such clamps or slave actuators are known in the art of drywall tool handles, for instance. Examples of heads, tools that may be mounted on heads, and pivot points for heads are described herein. In a number of embodiments, a linkage mechanism (e.g., 10), handle or an extendable handle, for example, may include an attachment mechanism, for instance, for mounting a tool on the handle. In various embodiments, a hinge connection may be located adjacent to the attachment mechanism, and the slave actuator may consist of or include a clamp releasably operated by a pull of the slave rod (e.g., 15), for instance. Operation of the clamp may lock the hinge connection to hold the tool in a particular orientation relative to the linkage mechanism or handle, for example.

In the embodiment shown in FIG. 1 and FIG. 4, for example, an operator may squeeze lever or master actuator 20 towards or against first structural member 14 using the operator's hand. In this embodiment, this motion or force is converted through pins 16 and 17 into motion, tension, or both, in master rod 14 (e.g., relative to or in opposition to first structural member 11), moving master wedge 54 and compressing spring 47 (or spring 104 in the embodiment illustrated in FIG. 10), causing master wedge 54 to slide along master slanted engagement surface 69 until master wedge slave rod orifice 53 contacts slave rod 15. This causes master wedge 54, slave wedge 75, and slave rod 15 to bind together due to friction, moving as a unit against spring 47 (or both springs 104 and 105 shown in FIG. 10), and activating the slave actuator. In this manner, elongated slave rod 15 engages slave wedge 75, in the embodiment illustrated.

Figure 11:
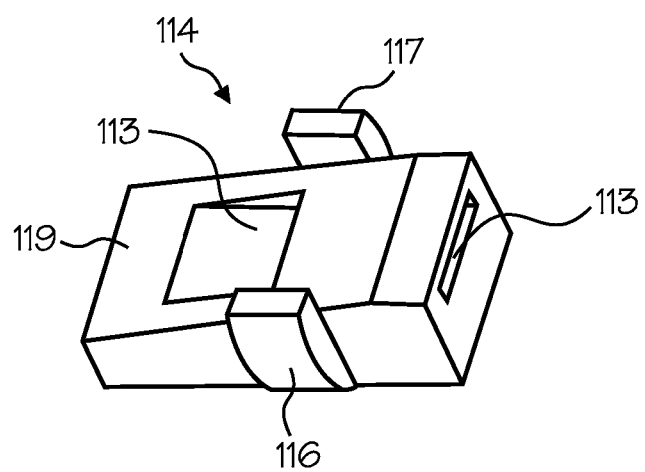
FIG. 11 is an isometric view of an alternate master wedge for the handle or linkage mechanism of FIG. 1, FIG. 4, and FIG. 10.
Figure 12:
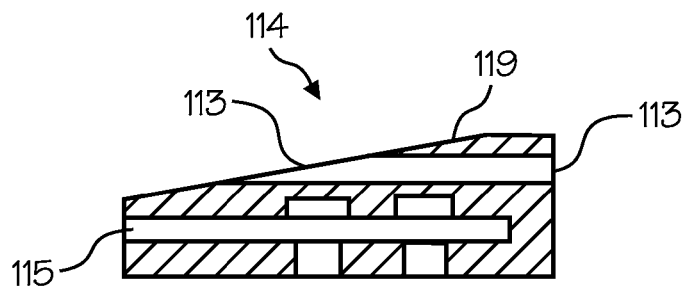
FIG. 12 is a bottom view of the alternate master wedge of FIG. 11 for the handle or linkage mechanism of FIG. 1, FIG. 4, and FIG. 10.

FIG. 11 and FIG. 12 illustrate an alternative to master wedge 54, namely, master wedge 114, which includes master slanted engagement surface 119, and master wedge slave rod orifice 113. This embodiment includes master wedge master rod orifice 115 and guide ears 116 and 117. Other embodiments may be apparent to a person of ordinary skill in the art.

FIG. 13 to FIG. 18 illustrate examples of apparatuses (e.g., handles, extendable handles, or linkage mechanisms) that include a body; a pivotably attached head; cylinder, actuator, or hydraulic actuator; a fluid passage or hose; and a valve, blocking means, or hydraulic control device, as examples. The valve, blocking means, or hydraulic control device may normally be open and may close only when held closed, and may be connected on one side to the fluid passage or hose and on another side to atmosphere. An operator may use a tool, such as a drywall flat box (e.g., shown in FIG. 19 to FIG. 21) attached to the head, by holding the handle and controlling pivoting of the head by operating the valve. Examples of various methods include providing for an operator to control a tool on a handle, and include acts such as providing the handle, for example, and instructing the operator to actuate the blocking means to hold the tool in a constant orientation relative to the handle.

Figure 13:
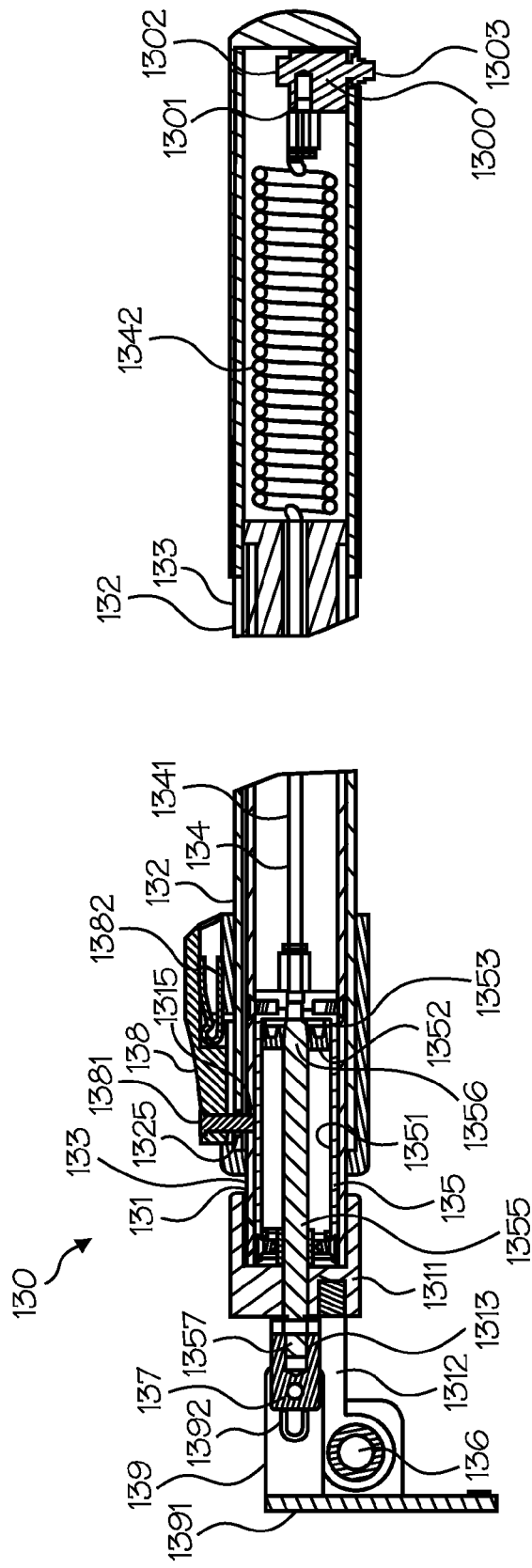
FIG. 13 is a partial cross-sectional side view of an alternate pneumatic embodiment of a handle, linkage mechanism, or apparatus.

FIG. 13 illustrates apparatus 130, which includes body 133; head 139 pivotably attached to body 133 at first pivot point 136, and cylinder 135 attached to (and inside of) body 133. In this embodiment, cylinder 135 has an inside surface 1351, and piston 1352 is located within cylinder 135. In this embodiment, the piston 1352 includes seal 1353 that slidably seals against inside surface 1351 of cylinder 135. Apparatus 130, in the embodiment illustrated, also includes rod 1355 connected at a first end 1356 to piston 1352 and pivotably connected at a second end 1357 to head 139 at second pivot point 137 (e.g., via piece 1313). In the embodiment illustrated, tube or hose 134 forms a fluid passage extending from cylinder 135 through body 133. In this embodiment, valve 1300 is connected on a first side 1301 to tube or hose 134 (the fluid passage) and on a second side 1302 to atmosphere.

In the embodiment illustrated, body 133 is hollow, and cylinder 135, tube or hose 134 (the fluid passage), and valve 1300 are all at least partially located within body 133. As can be seen, body 133 is elongated and forms a handle, and head 139 has mounting surface 1391 for attaching a tool (e.g., flat box 190 shown in FIG. 19 to FIG. 21). Surface 1391 may be adapted specifically for connection to the tool, for example, with holes, a particular shape to match the tool, slots, indentations, projections, tabs, attachment features, fasteners, studs, or other adaptations for connecting to a specific tool or family of tools, for example. In this embodiment, apparatus 130 is configured for an operator to use the tool by holding the handle (e.g., body 133) and to control pivoting of head 139 about first pivot point 136 by operating valve 1300.

In the embodiment shown, tube or hose 134 is specifically a hose, which forms a fluid passage from cylinder 135 to valve 1300. In this embodiment, valve 1300 is a type that is normally open (e.g., from port or side 1301 to port or side 1302) and that closes (e.g., only) when held closed by an operator (e.g., by depressing button 1303). Further, in this embodiment, body 133 includes first structural member 131 and second structural member 132, and first structural member 131 slidably engages second structural member 132 over a range of distance. First structural member 131 and second structural member 132 may be similar to first and second structural members 11 and 12 described above, in some embodiments, as examples. In this example, body 133 further includes a locking mechanism 138 (e.g., which may be similar to locking mechanism 18 described above) which is configured to releasably lock first structural member 131 to second structural member 132 at multiple points over the range of distance. In the embodiment shown, first structural member 131 and second structural member 132 are both tubular and first structural member 131 telescopically engages second structural member 132 over the range of distance.

Further, in this embodiment, locking mechanism 138 includes pin 1381 that fits through hole 1325 in second structural member 132 and into (e.g., through) hole 1315 in first structural member 131. In this embodiment, first structural member 131 has multiple holes 1315 in or through the wall of structural member 131 to provide for locking structural member 131 to structural member 132 at multiple points within the range of distances described herein. These holes 1315 in first structural member 131 may be, for example, four (4) inches apart. In other embodiments, holes 1315 may be 1, 1.5, 2, 2.5, 3, 3.5, 4.5, 5, 5.5, or 6 inches apart, as other examples. In the embodiment illustrated, spring 1382 biases pin 1381 into holes 1325 and 1315, and an operator releases locking mechanism 138 by squeezing the side of locking mechanism 138 that contains spring 1382, for example.

In the embodiment shown, cylinder 135, the fluid passage (e.g., tube or hose 134), and valve 1300 are located at least partially within body 133. Further, in this embodiment, head 139 is pivotably attached (i.e., at first pivot point 136) to first structural member 131 (via cap 1311 and bracket 1312), cylinder 135 is located at least partially within first structural member 131, the fluid passage (e.g., tube or hose 134) includes helically wound hose, and valve 1300 is located at least partially in second structural member 132. Hose or tube or hose 134 is helically wound at section 1342, in this embodiment, which provides for expansion and contraction when apparatus 130 is extended or retracted over the range of distances or handle lengths, for example. In this embodiment, section 1341 of tube or hose 134 is straight, as shown. In other embodiments, all of the hose may be helically wound, the hose may double back within the body to provide for extension and retraction, or both. In some embodiments, a sliding seal may provide for extension and retraction, as another example.

Still referring to FIG. 13, cylinder 135 is an example of an actuator (e.g., a hydraulic or pneumatic actuator), which, in this embodiment, is attached to first structural member 131 and attached to head 139 (i.e., via rod 1355, piece 1313, and second pivot point 137), and which is positioned and configured to control movement of head 139, for example, relative to first structural member 131 about first pivot point 136. Other embodiments may have other types of actuators, besides cylinders, such as hydraulic motors, pumps, diaphragms, balloons, bourdon tubes, or the like. As used herein, the term "hydraulic" includes "pneumatic". In other words, air is a type of hydraulic fluid that may be used in a number of embodiments. Other embodiment may use other hydraulic fluids such as oil, water, or another gas, such as nitrogen. Cylinder 135 is an example of a hydraulic actuator located at least partially within a first tubular member (i.e., structural member 131) and positioned and configured to control movement of head 139 relative to the first tubular member about first pivot point 136.

In this example, tube or hose 134 extends from the actuator (e.g., cylinder 135), through tubular first structural member 131 to (e.g., into) second structural member 132, which is also tubular. Further, in this embodiment, valve 1300 (e.g., connected on first side 1301 to tube or hose 134) is an example of a blocking means for blocking movement of fluid through tube or hose 134. In this example, the blocking means (e.g., valve 1300) is located at (e.g., within) second structural member 132. Valve 1300 is also an example of a hydraulic control device which is connected to tube or hose 134, and the hydraulic control device is located at least partially within tubular second structural member 132. Moreover, manual operation of the hydraulic control device (e.g., valve 1300), in this embodiment, causes the hydraulic actuator (e.g., cylinder 135) to actuate (e.g., stop movement) via hydraulic fluid (e.g., air) in the hose (e.g., tube or hose 134) to control movement of head 139, for instance, relative to tubular first member 131 about first pivot point 136. In a number of embodiments, the hydraulic actuator (e.g., cylinder 135) is a pneumatic actuator, the hydraulic control device (e.g., valve 1300) is a pneumatic control device, the hydraulic fluid is air, and the hose (e.g., tube or hose 134) contains air.

Other embodiments may use other hydraulic control devices or blocking means (e.g., instead of valve 1300), such as other valves, an open orifice that is sized, shaped, and positioned to be blocked by an operator using a portion of the operator's hand (e.g., a finger or the palm of the hand), a portion of tube or hose 134 that can be squeezed or kinked to block flow therethrough, or the like. In various embodiments, the hydraulic control device or blocking means (e.g., valve 1300 or other blocking means alternatives) is a type that is normally open and that closes when held closed by an operator, for example.

In various embodiments, such as the embodiment shown, the hydraulic control device or blocking means (e.g., valve 1300) is open on a second side (e.g., side 1302) to atmosphere for release or introduction of air (e.g., as a hydraulic fluid) through tube or hose 134 to the actuator (e.g., cylinder 135). In the embodiment illustrated, body 133 is elongated and forms a handle, and head 139 includes mounting surface 1391 for a tool, and may be adapted for connection to the tool. In this embodiment, apparatus 130 is configured for an operator to use the tool by holding the handle (e.g., body 133) and to control pivoting of head 139 about first pivot point 136 by operating the hydraulic control device or blocking means (e.g., valve 1300). In a number of embodiments, the body (e.g., 133) is hollow, and the actuator (e.g., cylinder 135), the hose (e.g., tube or hose 134), and the hydraulic control device or blocking means (e.g., valve 1300) are all at least partially located within the body (e.g., 133). In the embodiment illustrated, for example, the hydraulic control device or blocking means is located at least partially within second structural member 132.

Figure 14:
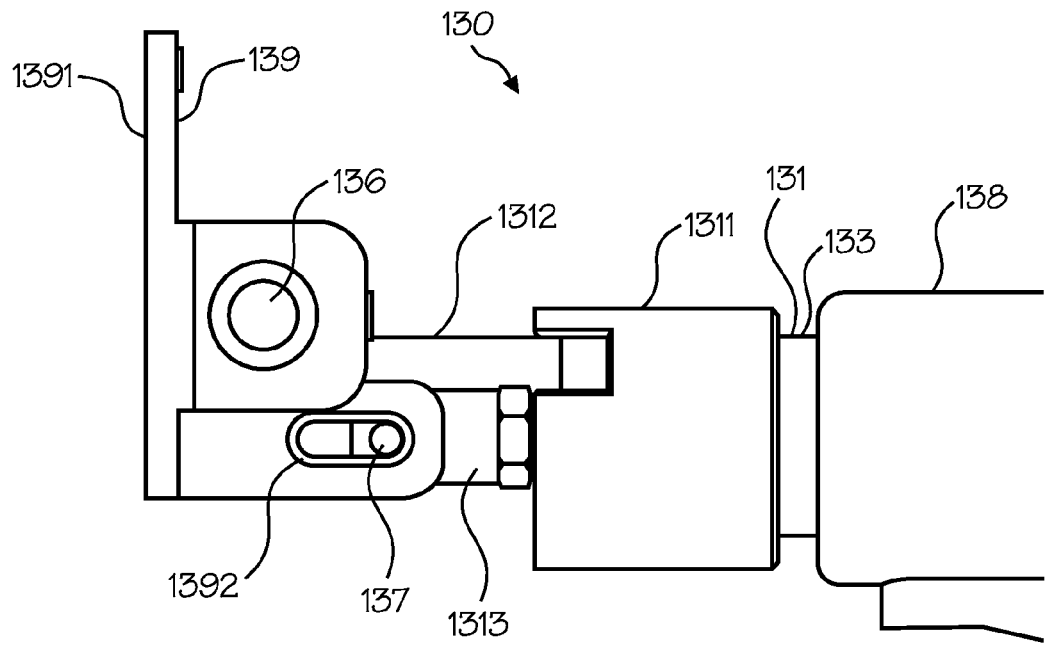
FIG. 14 is a side view of an end of the pneumatic apparatus or handle of FIG. 13, showing the head in a particular orientation with the mounting surface (e.g., for attaching a tool) perpendicular to the axis of the apparatus or handle.
Figure 15:
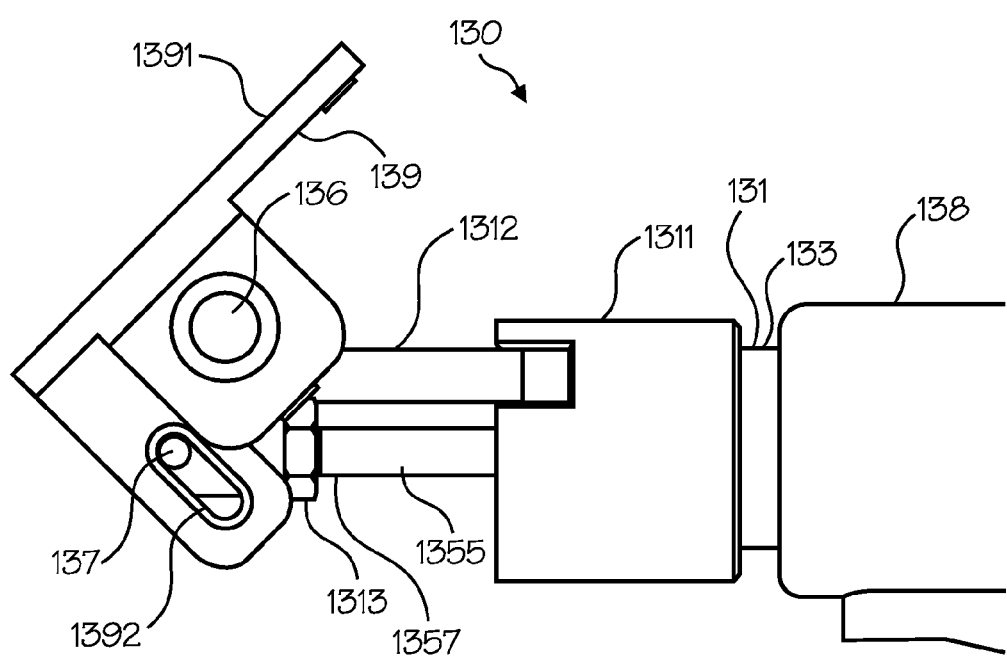
FIG. 15 is a side view of the end of the pneumatic apparatus or handle of FIG. 13, showing the head in a different orientation than in FIG. 14, with the mounting surface (e.g., for attaching a tool) set at a 45 degree angle to the axis of the apparatus or handle.
Figure 16:
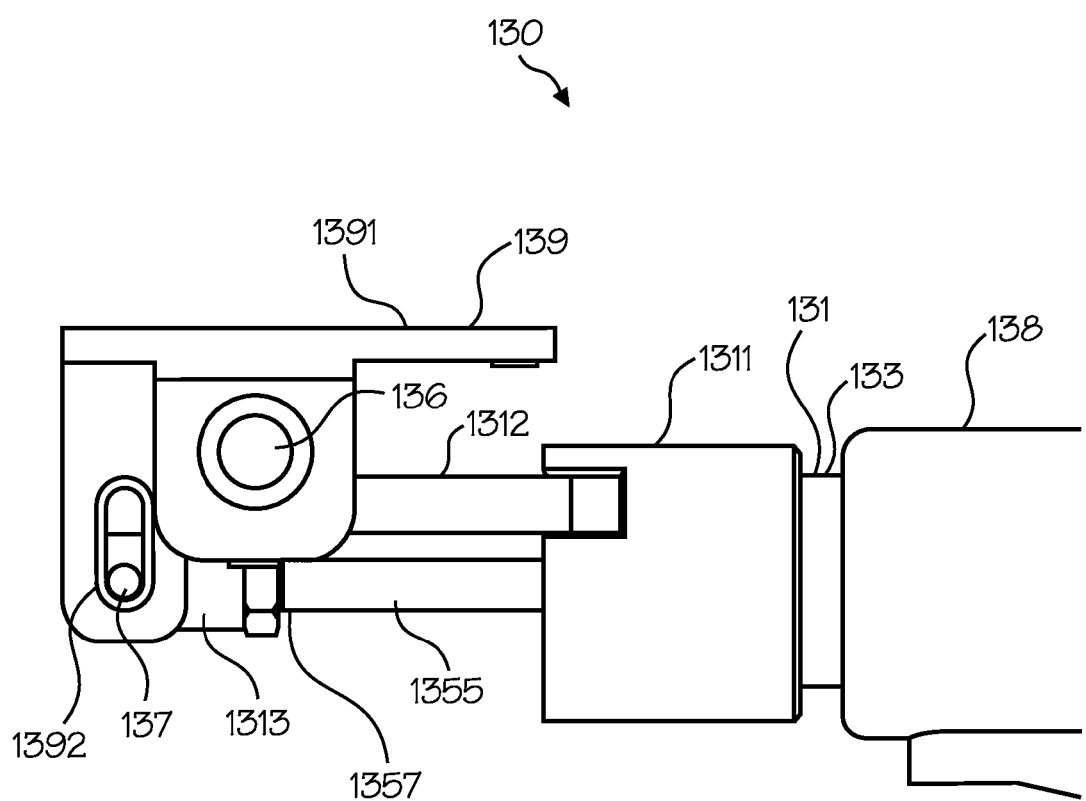
FIG. 16 is a side view of the end of the pneumatic apparatus or handle of FIG. 13, showing the head in a yet another orientation, with the mounting surface (e.g., for attaching a tool) set parallel to the axis of the apparatus or handle.
Figure 17:
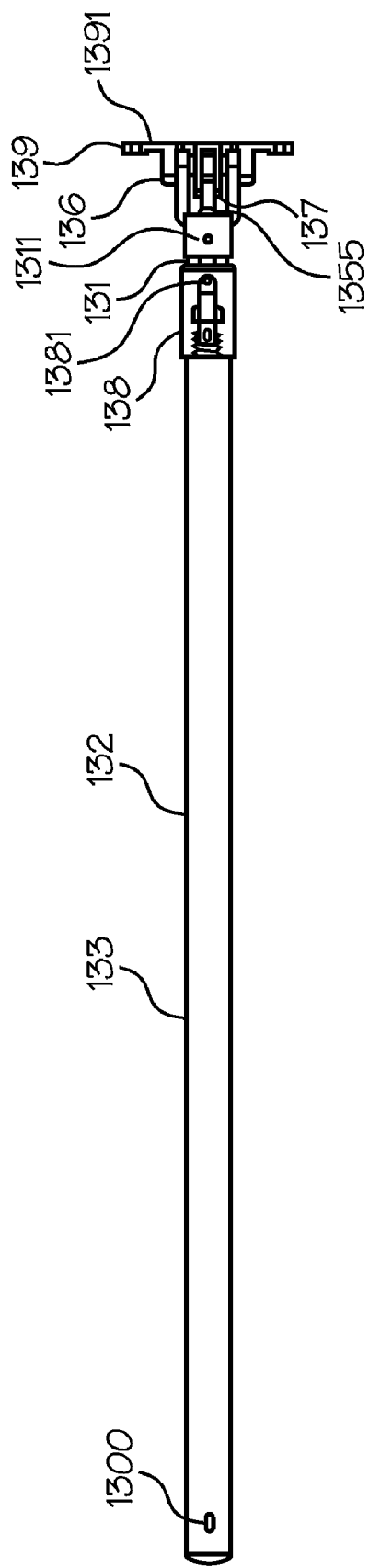
FIG. 17 is a bottom view of the pneumatic apparatus or handle of FIG. 13 (excluding the tool of some embodiments) and showing the head in the orientation of FIG. 13 and FIG. 15 with the mounting surface (e.g., for attaching a tool) perpendicular to the axis of the apparatus or handle.
Figure 18:
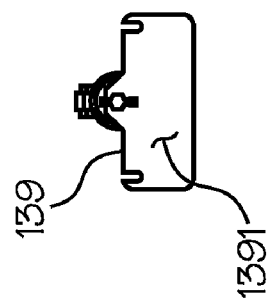
FIG. 18 is an end view of the pneumatic apparatus or handle of FIG. 13 and FIG. 17 showing the head in the orientation of FIG. 13, FIG. 15, and FIG. 17 with the mounting surface (e.g., for attaching a tool) perpendicular to the axis of the apparatus or handle.

FIG. 14 to FIG. 16 illustrate how the actuator (e.g., cylinder 135) of apparatus 130 can hold head 139 and the tool attached thereto, at various angles. In FIG. 14, tool mounting surface 1391 is substantially vertical, in FIG. 15, tool mounting surface 1391 is approximately at a 45 degree angle, and in FIG. 16, tool mounting surface 1391 is substantially horizontal. Positions at any angle therebetween are also available in this embodiment. As shown, rod 1355 extends farther in subsequent figures. In the embodiment illustrated, pivot point 137 has an elongated or oval hole 1392 so that rod 1355 can move linearly as head 139 rotates. As described below with reference to FIG. 23 to FIG. 26, other embodiments may use a linkage from the actuator to the head (e.g., 139) rather than elongated hole 1392. FIG. 17 and FIG. 18 show apparatus 130 from different angles and are external views rather than cross-sectional views.

Figure 19:
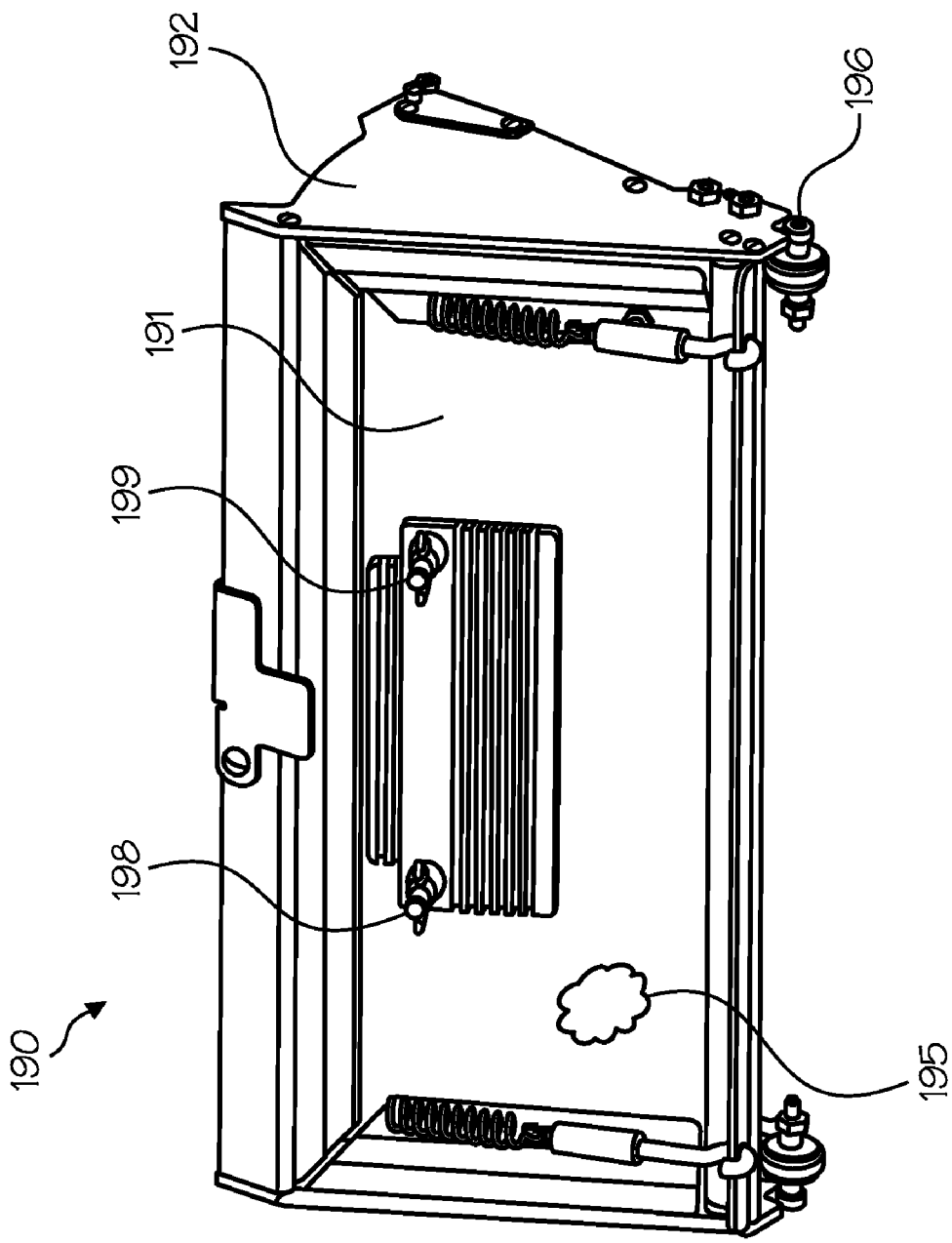
FIG. 19 is an isometric view of a flat box drywall tool that can be mounted on the mounting surface (e.g., for attaching a tool) of the head of the apparatus, handle, or linkage mechanism of FIG. 1 to FIG. 18, showing, among other things, the pressure plate and a side plate which partially define the chamber containing drywall joint compound.
Figure 20:
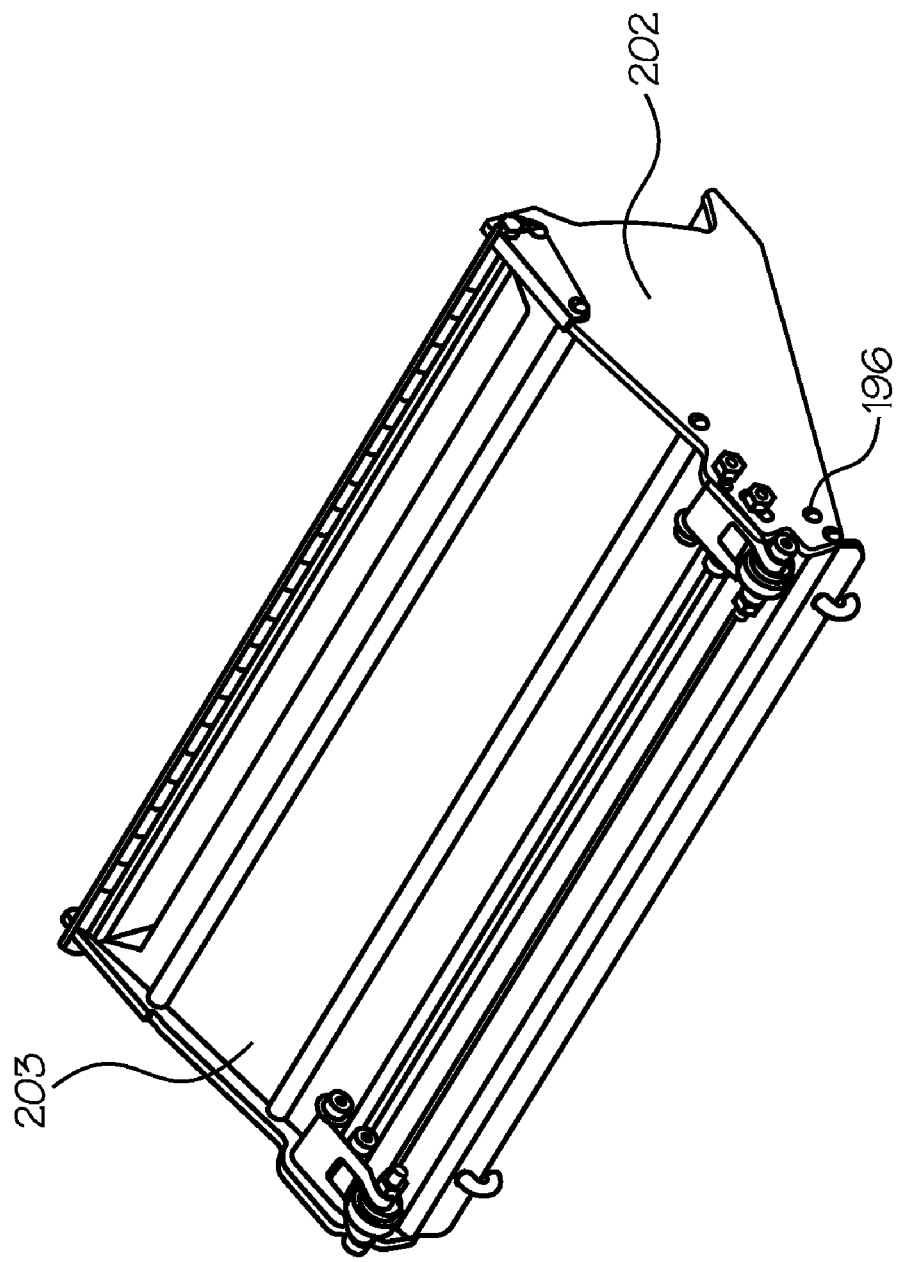
FIG. 20 is an isometric view of the flat box drywall tool if FIG. 19 that can be mounted on the mounting surface (e.g., for attaching a tool) of the head of the apparatus, handle, or linkage mechanism of FIG. 1 to FIG. 18, showing, among other things, the back plate and a side plate which partially define the chamber containing drywall joint compound.
Figure 21:
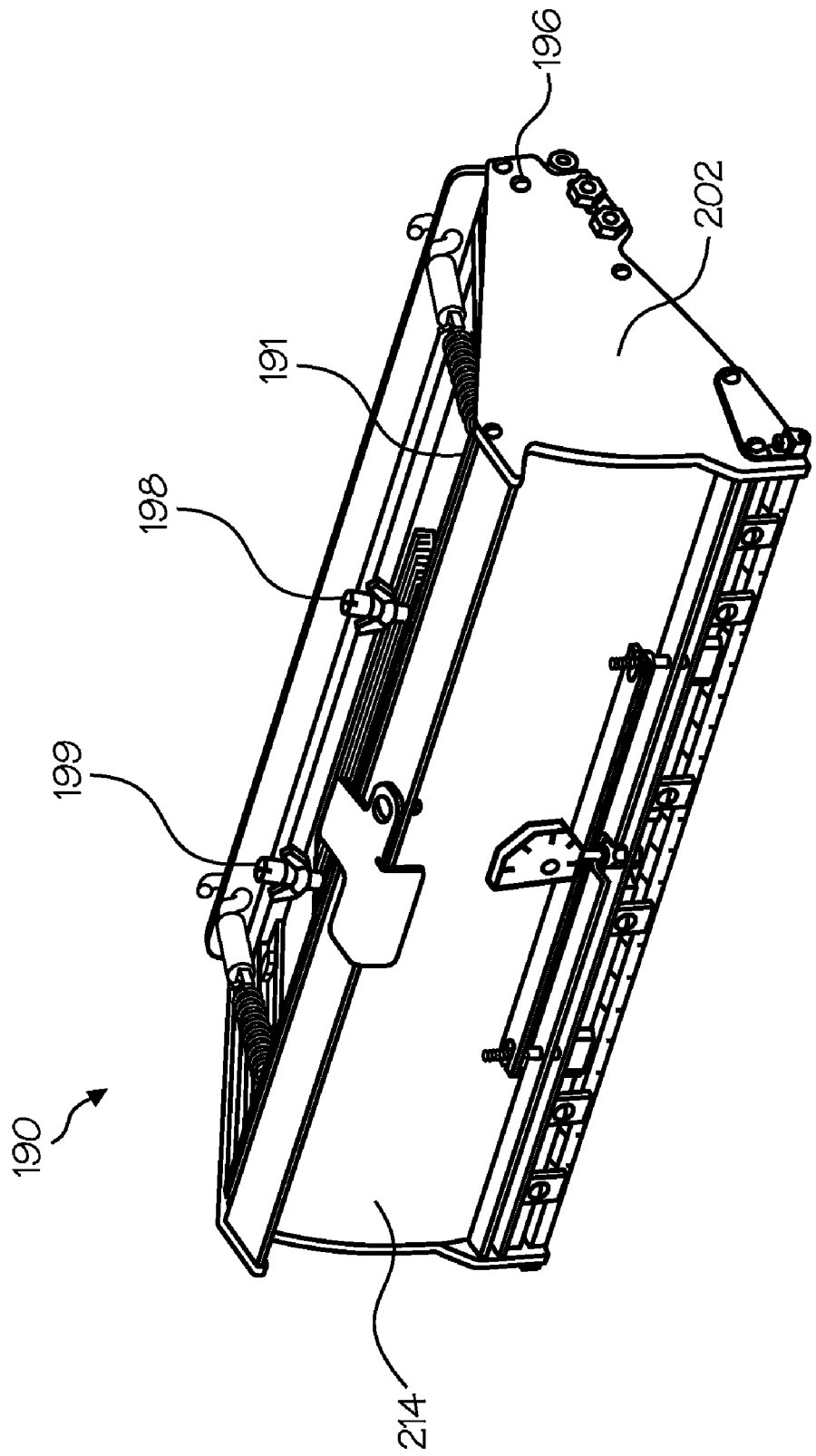
FIG. 21 is an isometric view of the flat box drywall tool if FIG. 19 that can be mounted on the mounting surface (e.g., for attaching a tool) of the head of the apparatus, handle, or linkage mechanism of FIG. 1 to FIG. 18, showing, among other things, the radius plate, a side plate, and the pressure plate which define the chamber containing drywall joint compound.

Other embodiments are or include tools (e.g., improved tools) for use by an operator, for example, for dispensing drywall joint compound into joints between sheets of drywall. Such tools may include, among other things, or may be used with, an extendable linkage mechanism, handle, or apparatus (e.g., 10 or 130), as described herein, as examples. FIG. 19 to FIG. 21 illustrate an example of a drywall finishing tool or flat box 190, which may, for example, be mounted to mounting surface 1391 of head 139 shown in FIG. 13 through FIG. 18, for example, or to a similar surface or head for linkage mechanism 10.

In this embodiment, flat box 190 includes chamber 195 that is defined by pressure plate 191, side plates 192 and 202, back plate 203, and radius plate 214. In this embodiment, pressure plate 195 pivots about a hinge connection 196 that is stationary relative to side plates 192 and 202, back plate 203, and radius plate 214, and forms a seal against radius plate 214 and side plates 192 and 202. In this embodiment, mounting surface 1391 attaches to pressure plate 191 via mounting fasteners, screws, or studs 198 and 199. In other embodiments, other mounting hardware or systems may be used.

When in use, the operator holds back plate 203 against the drywall surface (e.g., a vertical wall or horizontal ceiling) and applies pressure via the handle (e.g., 10 or 130) to secrete drywall mud from chamber 195, while moving tool 190 to smooth the drywall mud and form a uniform flat surface. In the embodiments illustrated, the operator may use master actuator or lever 20 or valve, blocking means, or hydraulic control device 1300, as examples, to fix the angle of flat box 190 relative to the handle (e.g., 10 or 130) and relative to the drywall surface.

Various embodiments include, for example, chamber 195 for containing drywall joint compound, an extendable handle (e.g., 10 or 130) configured to attach to the chamber (e.g., to pressure plate 191 of chamber 195). As mentioned above, the extendable handle (e.g., 10 or 130) may have a range of handle length, and may include, for example, a first tubular member (e.g., 11 or 131), a second tubular member (e.g., 12 or 132) telescopically engaging the first tubular member (e.g., 11 or 131) over the range of handle length, a locking mechanism (e.g., 18 or 138), for instance, configured to releasably lock the first tubular member (e.g., 11 or 131) to the second tubular member (e.g., 12 or 132) at multiple points over the range of handle length. Various embodiments may have other components as well, for example, described above for linkage mechanism 10, apparatus 130, or both.

Certain embodiments may include, for example, an attachment mechanism (e.g., head 139, mounting surface 1391, fasteners 198 and 199, or a combination thereof) for mounting chamber 195 on the handle (e.g., 10 or 130), a hinge connection (e.g., first pivot point 136) adjacent to the attachment mechanism connecting the attachment mechanism to, for example, the second tubular member (e.g., 12 or 132), and a clamp mounted on the second tubular member (e.g., 12 or 132), for example, or a hydraulic actuator (e.g., cylinder 135). In the example of a clamp, the clamp may be releasably operated by a pull of the slave rod (e.g., 15), and operation of the clamp may lock the hinge connection to hold chamber 195 in a particular orientation relative to the handle (e.g., 10). On the other hand, in the example of a hydraulic actuator (e.g., cylinder 135), the hydraulic actuator may be releasably operated by actuation of the hydraulic actuator or blocking means (e.g., valve 1300), and operation of the hydraulic actuator or blocking means (e.g., valve 1300), may prevent rotation about the hinge connection (e.g., pivot point 136) to hold chamber 195 in a particular orientation relative to the handle (e.g., 130).

Figure 22:
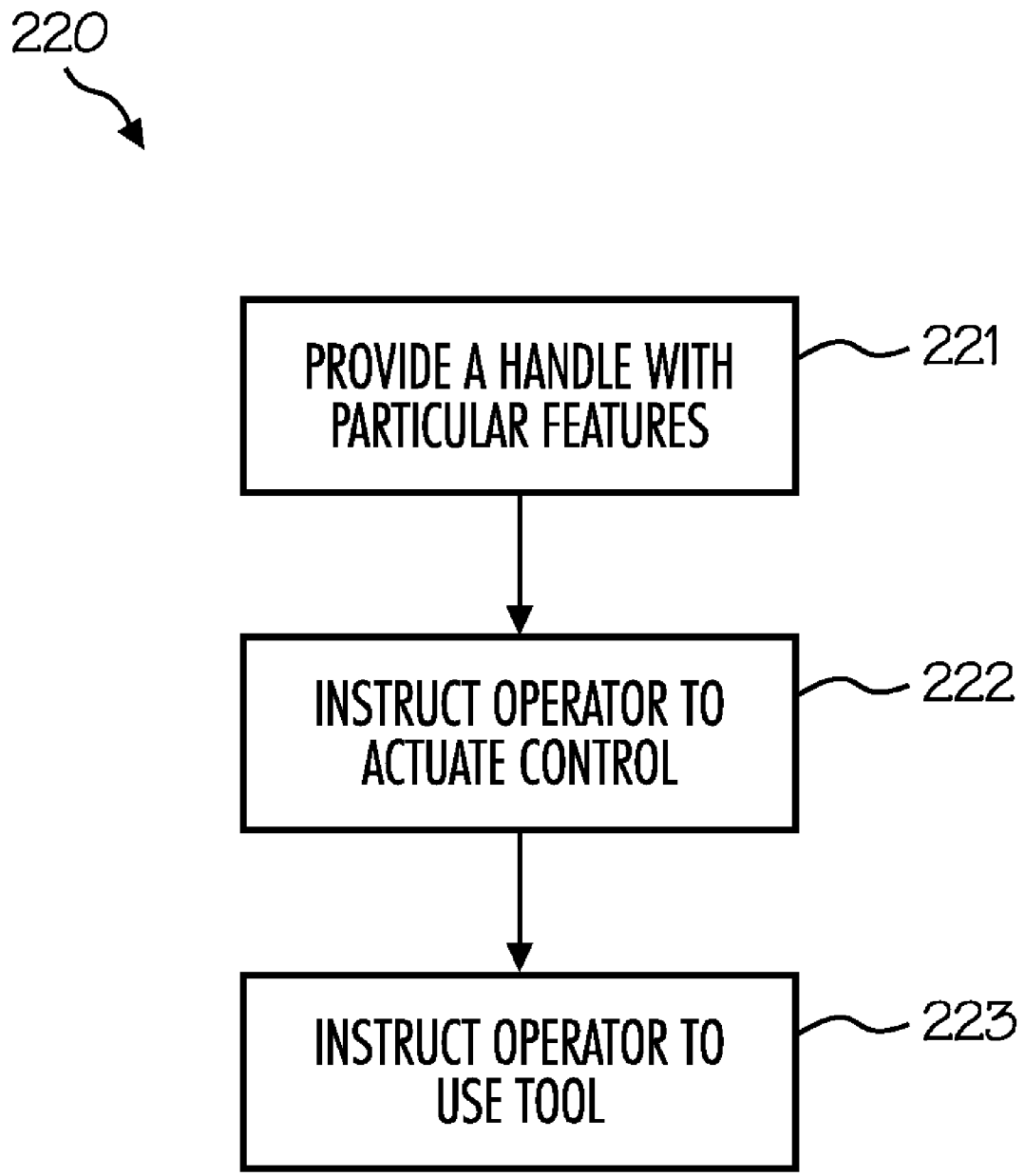
FIG. 22 is a flow chart illustrating, among other things, an example of a method of providing for an operator to control a tool on a handle.

Some embodiments are or include methods which include various steps or acts which may be performed in any order unless order is indicated, advantageous, or apparent. Examples include various methods of providing for an operator to control a tool (e.g., flat box 190) on a handle (e.g., linkage mechanism 10 or apparatus 130), for instance. FIG. 22 illustrates an example of such a method, method 220, which includes (e.g., in any order) at least certain acts. Although described in reference to a single handle or apparatus, for example, many methods may involve multiple handles or apparatuses, for instance. The acts of method 220 include act 221 of providing a handle with particular features. A specific example of act 221 involves providing an extendable handle (e.g., apparatus 130), for instance, configured to be attached to the tool (e.g., flat box 190), the extendable handle (e.g., apparatus 130) including a body (e.g., 133) that includes first structural member 131 and second structural member 132, for instance.

In this example, when the body (e.g., 133) is assembled, first structural member 131 slidably engages second structural member 132, for example, over a range of distance. Further, the body includes a locking mechanism (e.g., 138), for instance, configured to releasably lock first structural member 131 to second structural member 132 at multiple points over the range of distance. Moreover, first structural member 131 and second structural member 132 are both tubular, and when body 133 is assembled, first structural member 131 telescopically engages second structural member 132 over the range of distance.

Further, in this particular embodiment, the handle (e.g., apparatus 130) provided in act 221 includes a head (e.g., 139), and when the extendable handle (e.g., 130) is assembled, the head (e.g., 139) is pivotably attached to the first structural member (e.g., 131, for instance, attached as shown in FIG. 13) at a first pivot point (e.g., 136). Moreover, in this embodiment, the handle (e.g., apparatus 130) provided in act 221 includes an actuator (e.g., cylinder 135) which, when the extendable handle (e.g., apparatus 130) is assembled, is attached to the first structural member (e.g., 131) and is attached (e.g., as shown in FIG. 13) to the head (e.g., 139), and is positioned and configured to control movement of the head (e.g., 139) relative to the first structural member (e.g., 131) about the first pivot point (e.g., 136), for instance, as shown in FIG. 13.

In this particular embodiment, the handle (e.g., apparatus 130) provided in act 221 further includes a hose (e.g., tube or hose 134) which, when the extendable handle is assembled, extends inside the body (e.g., 133) from the actuator (e.g., cylinder 135) into the second structural member (e.g., 132). In some embodiments, the handle (e.g., apparatus 130) provided in act 221 also includes a hydraulic control device or a blocking means (e.g., valve 1300) for blocking movement of fluid through the hose (e.g., tube or hose 134) at the second structural member (e.g., 132), as examples. In other embodiments, the handle provided in act 221 may include other structure or features of apparatus 130, or may include structure or features of linkage mechanism 10, as another example.

In some embodiments, the act (e.g., 221) of providing an extendable handle (e.g., apparatus 130) specifically comprises providing, as the blocking means, a valve (e.g., 1300) connected on a first side (e.g., 1301) to the hose (e.g., tube or hose 134), and connected on a second side (e.g., 1302) to the atmosphere for release or introduction of air through the hose (e.g., tube or hose 134) to the actuator (e.g., cylinder 135).

In the embodiment illustrated, method 220 also includes an act 222 of instructing an operator to activate the control. Examples of such a control include the hydraulic control device, blocking means, valve (e.g., 1300), and handle or master actuator 20 described herein and shown in the drawings. In a specific example, for instance, act 222 includes instructing an operator of the tool (e.g., flat box 190) to actuate the blocking means (e.g., valve 1300) to hold the tool (e.g., flat box 190) in a constant orientation relative to the handle (e.g., apparatus 130 or body 133). Further, in the embodiment illustrated, method 220 further includes act 223 of instructing an operator to use the tool (e.g., to use flat box 190 to apply drywall joint compound to joints between sheets of drywall installed on a wall or ceiling surface). In a specific example, act 223 includes instructing an operator of the tool to attach a drywall tool (e.g., flat box 190) to the handle (e.g., to apparatus 130 or linkage mechanism 10) and use the drywall tool and handle to apply drywall joint compound to joints between sheets of drywall. Further, in a number of embodiments, method 220, act 222, or act 223 may include instructing an operator of the tool to release the blocking means (e.g., valve 1300) to allow the tool (e.g., flat box 190) to move relative to the handle (e.g., apparatus 130 or linkage mechanism 10).

Various such instructions may be provided in writing with the tool or handle (e.g., apparatus 130 or linkage mechanism 10), on packaging or on separate sheets, as examples. In various embodiments, instructions may include text, illustrations, pictures, recorded audio or video (e.g., an instructional DVD), or a combination thereof, as examples. In some embodiments, instructions may be provided on a website, in advertisements, orally, in demonstrations, by telephone, or the like. In some embodiments, instructions may be affixed to the product, for instance, via stickers or printing, as other examples.

FIG. 23 to FIG. 26 illustrate another embodiment which may be pneumatic, handle or apparatus 230, that uses a linkage 240 between actuator or cylinder 135 (e.g., attached to or within the body of apparatus 230) and the head (head 239 in this embodiment). Using linkage 240, in this embodiment, provides a greater range of angular motion of head 239 about pivot point 246 than some other embodiments. In some embodiments, for example, linkage 240 may allow 125 degrees of rotation about pivot point 246, whereas embodiments having elongated hole 1392 (e.g., as shown in FIG. 13 to FIG. 16) may provide only 90 degrees of rotation about pivot point 136, as another example. Different embodiments may allow 45, 60, 70, 75, 80, 85, 95, 100, 105, 110, 115, 120, 130, 135, 140, 145, 150, 155, 160, 165, 170, 175, or 180 degrees of rotation about the pivot point, as other examples, or angles within ranges therebetween.

Figure 23:
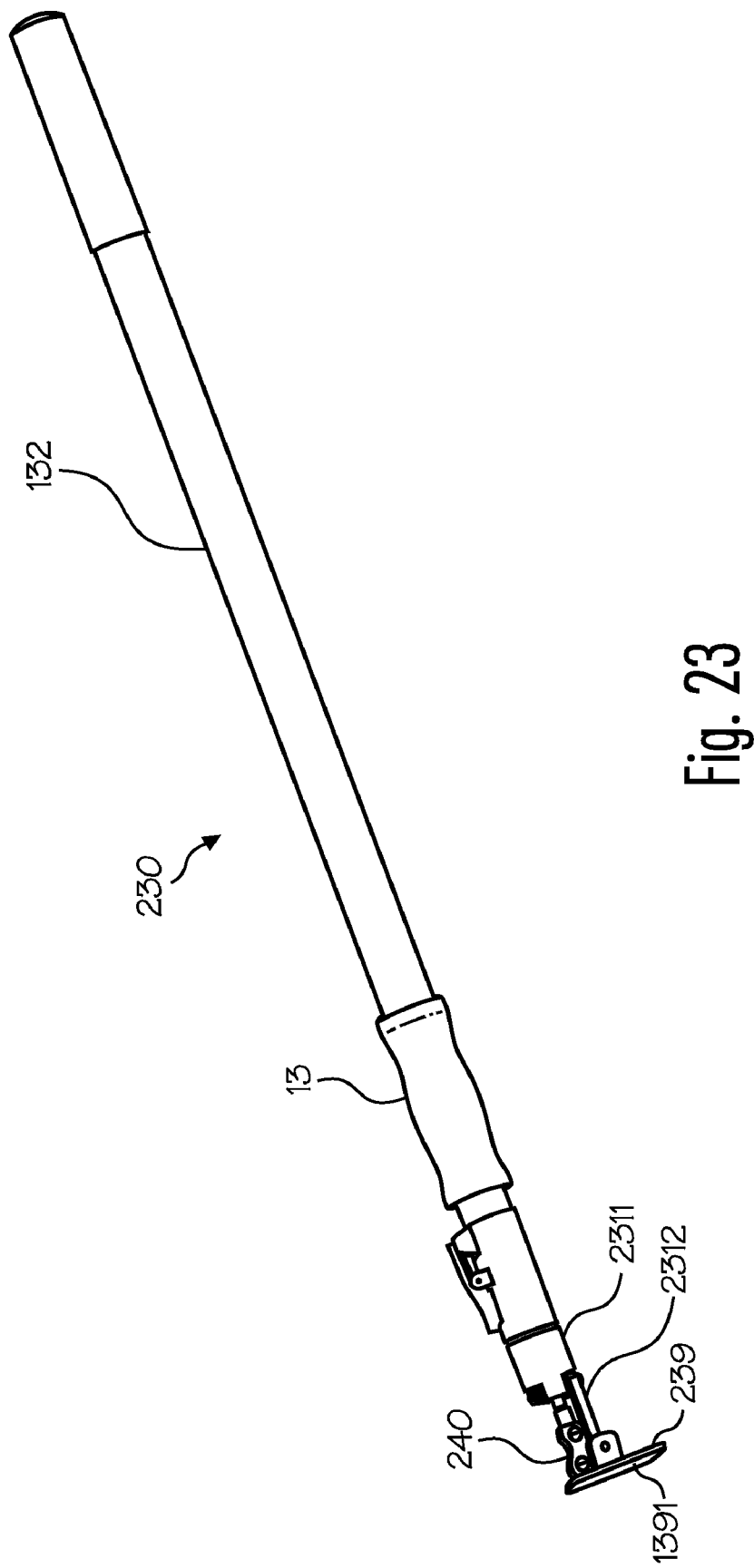
FIG. 23 is side view of an alternate embodiment of a handle, linkage mechanism, or apparatus, which may also be pneumatic.
Figure 24:
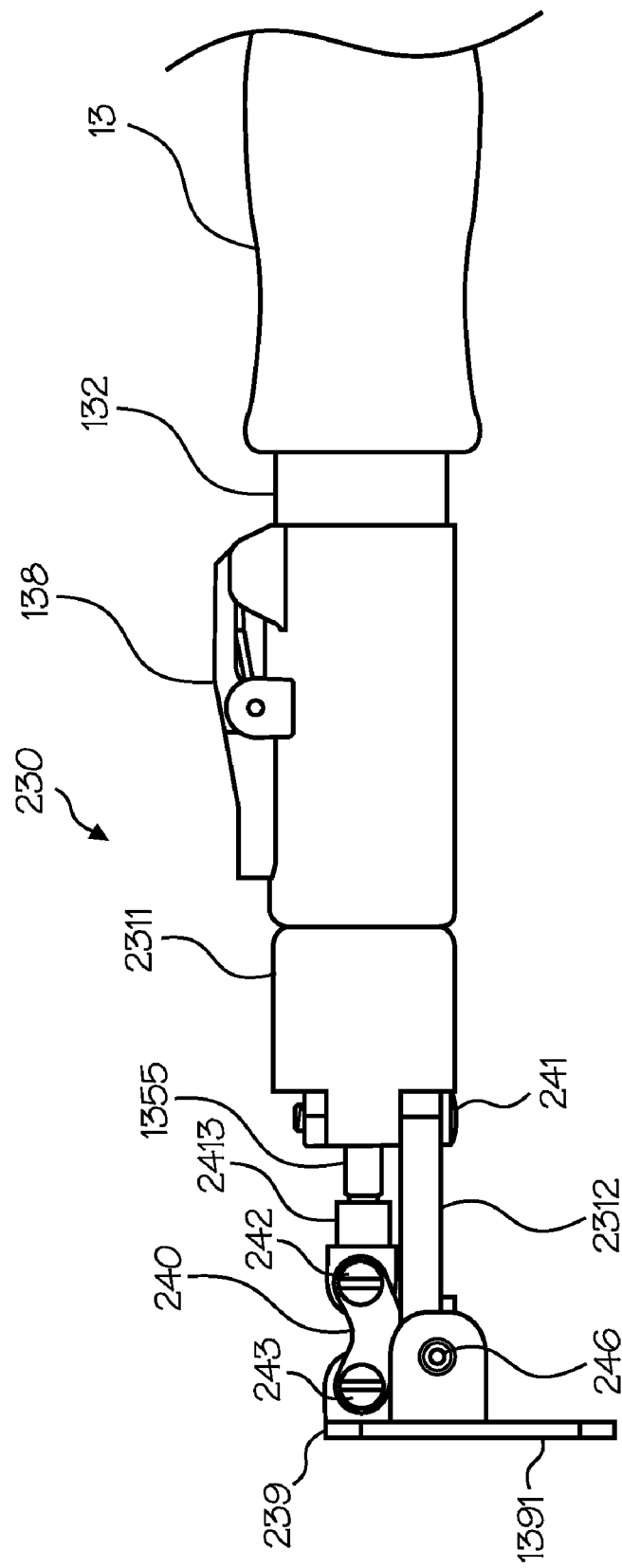
FIG. 24 is a partial side view of the alternate embodiment of FIG. 23 showing, among other things, a linkage between the actuator and the head.
Figure 26:
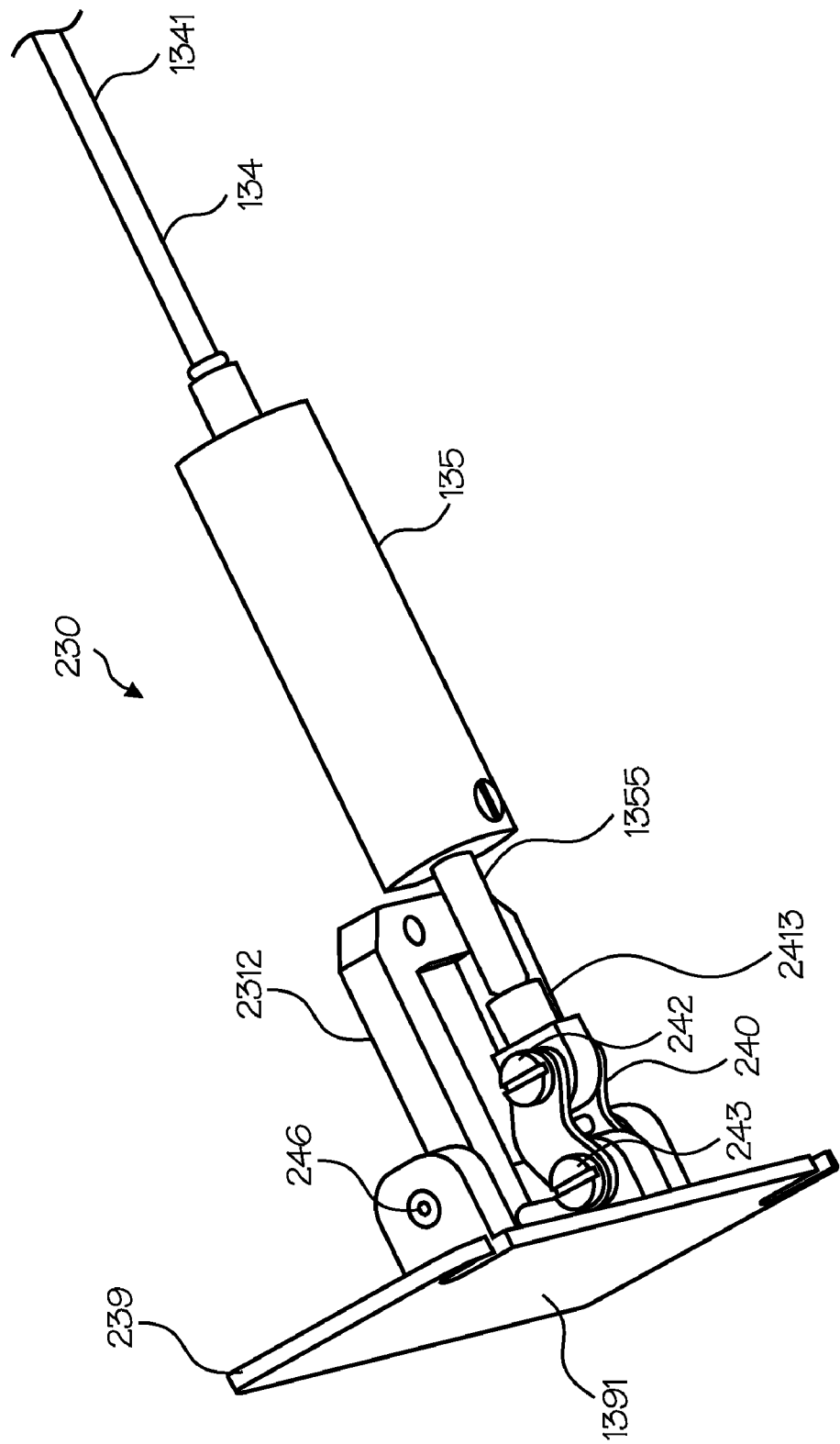
FIG. 26 is an isometric view of part of the alternate embodiment of FIG. 23 to FIG. 25, viewed from the same angle as in FIG. 25, with additional components removed for clarity, showing, among other things, the linkage between the actuator and the head, the actuator itself, and the bracket that holds the head.

In FIG. 23 and FIG. 24, handle or apparatus 230 is shown fully retracted. As handle or apparatus 230 is extended, structural member 131, for example, would appear between cap 2311 and locking mechanism 138, extending from structural member 132, and held there by locking mechanism 138. In the embodiment illustrated, head 239 is pivotably attached to the rest of (e.g., the body of) handle or apparatus 230 through pivot point 246 and bracket 2312. As shown in FIG. 26, in this embodiment, bracket 2312 is U-shaped, and is rigidly attached to cap 2311 (e.g., which may be similar to cap 1311 described above, and may be rigidly attached to structural member 131, for instance) via one or more fasteners or bolts 241. Rod 1355 of actuator or cylinder 135, in this embodiment, is pivotably connected (e.g., at a first end) to head 239 via piece 2413, fastener, pin, or bolt 242, linkage 240, and fastener, pin, or bolt 243.

As head 239 moves, linkage 240 pivots about fastener, pin, or bolt 242 relative to piece 2413 and rod 1355, and head 239 pivots about fastener, pin, or bolt 243 relative to linkage 240, for example. Fastener, pin, or bolt 242, 243, or both, may constitute a second pivot point, and, as used herein, in the embodiment illustrated, rod 1355 is connected at a first end to a piston (not show within cylinder 135 in FIG. 23 to FIG. 26, but shown in FIG. 13) and at a second end to head 239 at a second pivot point (e.g., fastener 242, 243, or both). Thus, as used herein, a rod being pivotably connected to a head, includes being connected through a linkage, such as linkage 240, with one or two pivot points therein. Further, as used herein, an actuator being attached to a head, and positioned and configured to control movement of the head (e.g., relative to a particular structural member) may include being attached to the head through a linkage, such as linkage 240 (e.g., with one or two pivot points therein). Moreover, in the embodiment illustrated, piece 2413 is rigidly attached to rod 1355. Thus, linkage 240 is an example of a linkage extending from a second pivot point (e.g., fastener, pin, or bolt 242) in rigid relation to the rod (e.g., 1355) to a third pivot point (e.g., fastener, pin, or bolt 243) in rigid relation to the head (e.g., 239). As used herein, "rigidly attached" and "in rigid relation" means that significant movement is not permitted between the two parts or portions mentioned (e.g., other than elastic and plastic deformation, which could not be completely avoided). In various embodiments, piece 2413 may be rigidly attached to rod 1355 via threads, an interference fit, a pin, welding, one or more fasteners, or the like, as examples.

In the embodiment illustrated, actuator or cylinder 135, which may be hydraulic or pneumatic, for instance, is an example of an actuator attached to a first structural member (e.g., member 131 inside of member 132) and attached to the head (e.g., 239), and positioned and configured to control movement of the head (e.g., 239) relative to the first structural member (e.g., 131) about the first pivot point (e.g., 246). Similar to other embodiments, a control device (e.g., hydraulic or pneumatic), blocking means (e.g., for blocking movement of fluid, such as air, through tube or hose 134), or valve (e.g., 1300, which may be a type that is normally open and that closes when held closed by an operator, for instance) may be located at or within the body or structural member 132 of apparatus 230, for instance. Such a control device, blocking means, or valve may be connected on a first side to tube or hose 134, for example, and on a second side to atmosphere, for instance.

Figure 25:
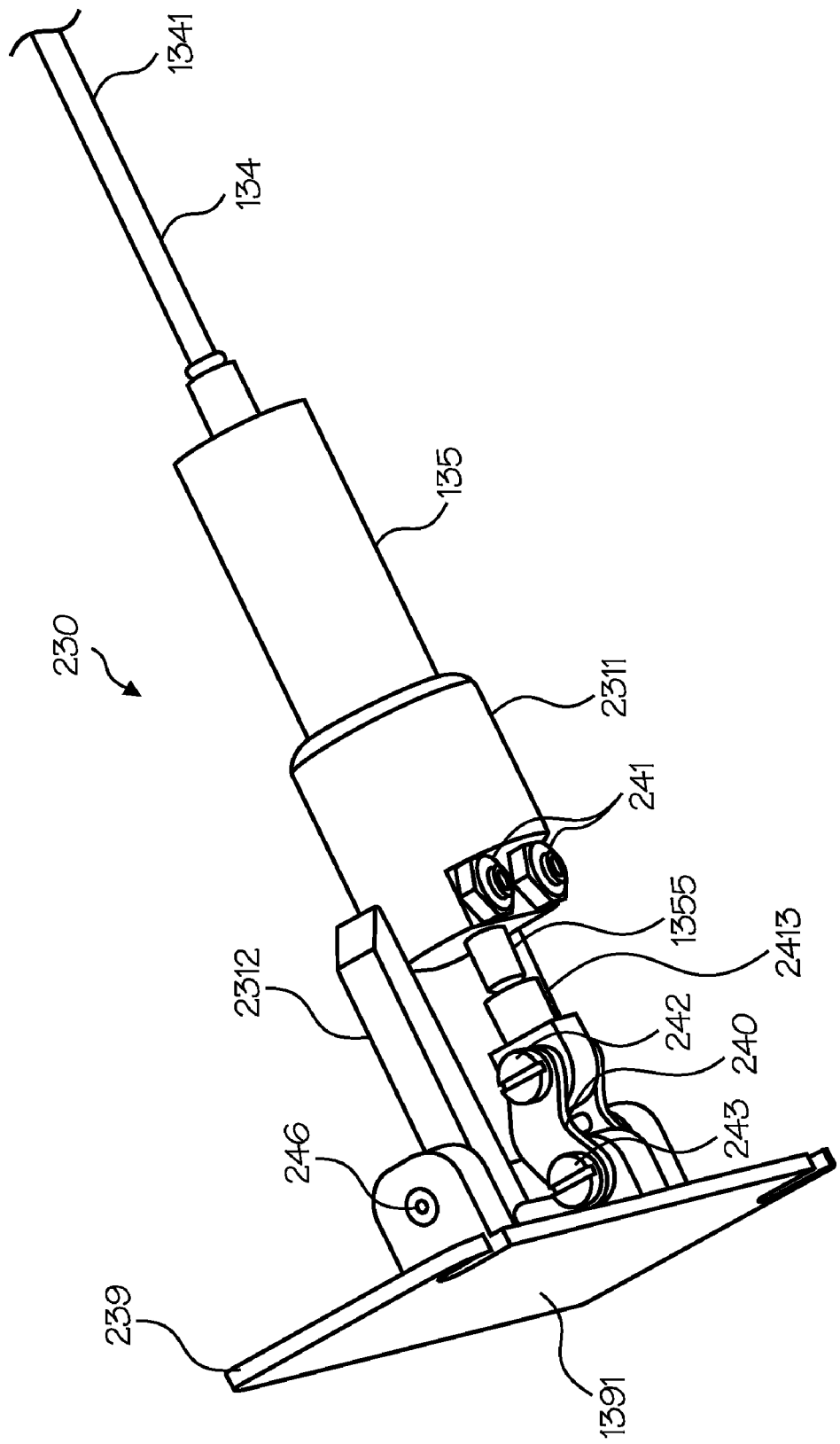
FIG. 25 is an isometric view of part of the alternate embodiment of FIG. 23 and FIG. 24, viewed from nearly the opposite side, with some components removed for clarity, showing, among other things, the linkage between the actuator and the head.

Further, as shown, for example, in FIGS. 25 and 26, in the embodiment illustrated, linkage 240 includes two bars and a beam therebetween. The beam may have a trapezoidal cross section, for example. The bars of linkage 240, in the embodiment illustrated, have an obtuse angle therein (e.g., at the midpoint of the bars), which may provide clearance between components as head 239 rotates about pivot point 246, for example. Other embodiments may differ. Further, other aspects and components of handle or apparatus 230 may be similar or identical to corresponding aspects or components of other embodiments described herein, for example.

The various components shown in the different drawings, described herein, or both, may be found in various combinations in different embodiments. For example, the flat box shown in FIG. 19 to FIG. 21 may be mounted on and used with either the handles or linkage mechanisms shown in FIG. 1 to FIG. 12, or may be mounted on and used with the handles or apparatuses shown in FIG. 13 to FIG. 18 or FIGS. 23 to 26, for instance. Further, the handles or linkage mechanisms shown in FIG. 1 to FIG. 12 may include a pivotable head, which may be similar in many respects to head 139 shown in FIG. 13 to FIG. 18 or to head 239 shown in FIG. 23 to FIG. 26. Other embodiments may be apparent to a person of ordinary skill in the art having studied this document, and may include features or limitations described herein, shown in the drawings, or both. Various methods may include part or all of the acts shown in FIG. 22, described herein, or known in the art, as examples.

What is claimed is:

1. An apparatus comprising:
   a body;
   a head pivotably attached to the body at a first pivot point;
   a cylinder attached to the body, the cylinder having an inside surface;
   a piston located at least partially within the cylinder, the piston comprising a seal that seals against the inside surface of the cylinder;
   a rod connected at a first end to the piston and pivotably connected at a second end to the head at a second pivot point;
   a fluid passage extending from the cylinder through the body; and
   a valve connected on a first side to the fluid passage and on a second side to atmosphere.

2. The apparatus of claim 1 wherein the body is hollow, and the cylinder, the fluid passage, and the valve are all at least partially located within the body; and wherein the body is elongated and forms a handle, and wherein the head comprises a mounting surface for a tool, and wherein the apparatus is configured for an operator to use the tool by holding the handle and to control pivoting of the head about the first pivot point by operating the valve.

3. The apparatus of claim 1 wherein the fluid passage comprises a hose, and wherein the valve is a type that is normally open and that closes when held closed by an operator.

4. The apparatus of claim 1 wherein the body comprises a first structural member and a second structural member wherein the first structural member slidably engages the second structural member over a range of distance, the body further comprising a locking mechanism configured to releasably lock the first structural member to the second structural member at multiple points over the range of distance.

5. The apparatus of claim 4 wherein the first structural member and the second structural member are both tubular and wherein the first structural member telescopically engages the second structural member over the range of distance, and wherein the cylinder, the fluid passage, and the valve are located at least partially within the body, and wherein the fluid passage comprises helically wound hose.

6. An apparatus comprising:
   a body wherein the body comprises a first structural member and a second structural member wherein the first structural member slidably engages the second structural member over a range of distance, the body further comprising a locking mechanism configured to releasably lock the first structural member to the second structural member at multiple points over the range of distance;
   a head pivotably attached to the first structural member at a first pivot point;
   an actuator attached to the first structural member and attached to the head, and positioned and configured to control movement of the head relative to the first structural member about the first pivot point;

a hose extending from the actuator to the second structural member;
a blocking means for blocking movement of fluid through the hose at the second structural member.

7. The apparatus of claim 6 wherein the actuator comprises a cylinder having an inside surface and a piston located at least partially within the cylinder, the piston comprising a seal that seals against the inside surface of the cylinder, the apparatus further comprising a rod connected at a first end to the actuator and pivotably connected at a second end to the head at a second pivot point.

8. The apparatus of claim 6 wherein the blocking means comprises a valve connected on a first side to the hose.

9. The apparatus of claim 6 wherein the blocking means comprises an open orifice sized, shaped, and positioned to be blocked by an operator using a portion of the operator's hand.

10. The apparatus of claim 6 wherein the blocking means is open on a second side to atmosphere for release or introduction of air through the hose to the actuator.

11. The apparatus of claim 6 wherein the body is hollow, and the actuator, the hose, and the blocking means are all at least partially located within the body; and wherein the body is elongated and forms a handle, and wherein the head comprises a mounting surface for a tool, and wherein the apparatus is configured for an operator to use the tool by holding the handle and to control pivoting of the head about the first pivot point by operating the blocking means.

12. The apparatus of claim 6 wherein the blocking means is a type that is normally open and that closes when held closed by an operator, wherein the first structural member and the second structural member are both tubular, wherein the first structural member telescopically engages the second structural member over the range of distance, wherein the hose is helically wound, and wherein the hose and the blocking means are at least partially located within the body.

13. A method of providing for an operator to control a tool on a handle, the method comprising in any order at least the acts of:
providing an extendable handle configured to be attached to the tool, the extendable handle comprising:
a body wherein the body comprises a first structural member and a second structural member wherein, when the body is assembled, the first structural member slidably engages the second structural member over a range of distance, the body further comprising a locking mechanism configured to releasably lock the first structural member to the second structural member at multiple points over the range of distance, and wherein the first structural member and the second structural member are both tubular and wherein, when the body is assembled, the first structural member telescopically engages the second structural member over the range of distance;
a head wherein, when the extendable handle is assembled, the head is pivotably attached to the first structural member at a first pivot point;
an actuator wherein, when the extendable handle is assembled, the actuator is attached to the first structural member and attached to the head, and positioned and configured to control movement of the head relative to the first structural member about the first pivot point;
a hose wherein, when the extendable handle is assembled, the hose extends inside the body from the actuator into the second structural member; and
a blocking means for blocking movement of fluid through the hose at the second structural member; and
instructing an operator of the tool to actuate the blocking means to hold the tool in a constant orientation relative to the handle.

14. The method of claim 13 wherein the act of providing an extendable handle comprises providing, as the blocking means, a valve connected on a first side to the hose, and connected on a second side to the atmosphere for release or introduction of air through the hose to the actuator.

15. The method of claim 13 further comprising an act of instructing an operator of the tool to attach a drywall tool to the handle and use the drywall tool and handle to apply drywall joint compound to joints between sheets of drywall.

16. The method of claim 13 further comprising an act of instructing an operator of the tool to release the blocking means to allow the tool to move relative to the handle.

17. An apparatus comprising:
an elongated body comprising a first tubular member and a second tubular member wherein the first tubular member slidably and telescopically engages the second tubular member over a range of distance, the body further comprising a locking mechanism configured to releasably lock the first tubular member to the second tubular member at multiple points over the range of distance;
a head pivotably attached to the first tubular member at a first pivot point;
a hydraulic actuator located at least partially within the first tubular member and positioned and configured to control movement of the head relative to the first tubular member about the first pivot point;
a hose extending from the hydraulic actuator, through the first tubular member, and into the second tubular member; and
a hydraulic control device connected to the hose, wherein the hydraulic control device is located at least partially within the second tubular member, wherein manual operation of the hydraulic control device causes the hydraulic actuator to actuate via hydraulic fluid in the hose to control movement of the head relative to the first tubular member about the first pivot point.

18. The apparatus of claim 17 wherein the hydraulic actuator comprises a cylinder having an inside surface and a piston located at least partially within the cylinder, the piston comprising a seal that seals against the inside surface of the cylinder the apparatus further comprising a rod connected at a first end to the hydraulic actuator.

19. The apparatus of claim 18 further comprising a linkage extending from a second pivot point in rigid relation to the rod to a third pivot point in rigid relation to the head.

20. The apparatus of claim 17 wherein the hydraulic control device comprises a valve connected on a first side to the hose.

21. The apparatus of claim 17 wherein the hydraulic actuator is a pneumatic actuator, the hydraulic control device is a pneumatic control device, the hydraulic fluid is air, and the hose contains air.

22. The apparatus of claim 21 wherein the hydraulic control device is open on a second side to atmosphere for release or introduction of air through the hose to the hydraulic actuator.

23. The apparatus of claim 17 wherein the body forms a handle, and wherein the head comprises a mounting surface for a tool, and is adapted for connection to the tool, and wherein the apparatus is configured for an operator to use the tool by holding the handle and to control pivoting of the head about the first pivot point by operating the hydraulic control device, and wherein the hydraulic control device is a valve of a type that is normally open and that closes when held closed by an operator.

* * * * *